United States Patent
Sawada et al.

(10) Patent No.: US 9,619,886 B2
(45) Date of Patent: Apr. 11, 2017

(54) IMAGE PROCESSING APPARATUS, IMAGING APPARATUS, IMAGE PROCESSING METHOD AND PROGRAM

(71) Applicant: CANON KABUSHIKI KAISHA, Tokyo (JP)

(72) Inventors: Keiichi Sawada, Tokyo (JP); Tomohiro Nishiyama, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 136 days.

(21) Appl. No.: 14/572,518

(22) Filed: Dec. 16, 2014

(65) Prior Publication Data
US 2015/0178595 A1    Jun. 25, 2015

(30) Foreign Application Priority Data

Dec. 19, 2013 (JP) .................................. 2013-262753
Sep. 10, 2014 (JP) .................................. 2014-184463

(51) Int. Cl.
*G06K 9/62* (2006.01)
*G06T 7/00* (2006.01)

(52) U.S. Cl.
CPC .......... *G06T 7/0069* (2013.01); *G06T 7/0022* (2013.01); *G06T 2207/10012* (2013.01); *G06T 2207/10052* (2013.01); *G06T 2207/20228* (2013.01)

(58) Field of Classification Search
CPC ................. G06T 7/0022; G06T 7/0069; G06T 2207/20228; G06T 2207/10052; G06T 2207/10012; H04N 13/0282
See application file for complete search history.

(56) References Cited

U.S. PATENT DOCUMENTS

| 8,228,417 | B1* | 7/2012 | Georgiev | G03B 11/00 348/335 |
| 2012/0176506 | A1* | 7/2012 | Tajiri | H04N 5/2254 348/222.1 |
| 2013/0114887 | A1* | 5/2013 | Nanri | G01C 3/085 382/154 |

FOREIGN PATENT DOCUMENTS

JP    2009-293970 A    12/2009

* cited by examiner

*Primary Examiner* — Jon Chang
(74) *Attorney, Agent, or Firm* — Canon USA Inc., IP Division

(57) ABSTRACT

An image processing apparatus includes an acquiring unit configured to acquire a first image of a subject viewed from a first point of view and a second image of the subject viewed from a second point of view different from the first point of view, wherein the first image and the second image have different blurred states from each other; a processing unit configured to change a blurred state of at least one of the first image and the second image; and a determining unit configured to compare the first image and the second image after the blurred state of at least one of the first image and the second image is changed by the processing unit to determine image regions corresponding to the subject between the first image and the second image.

12 Claims, 19 Drawing Sheets

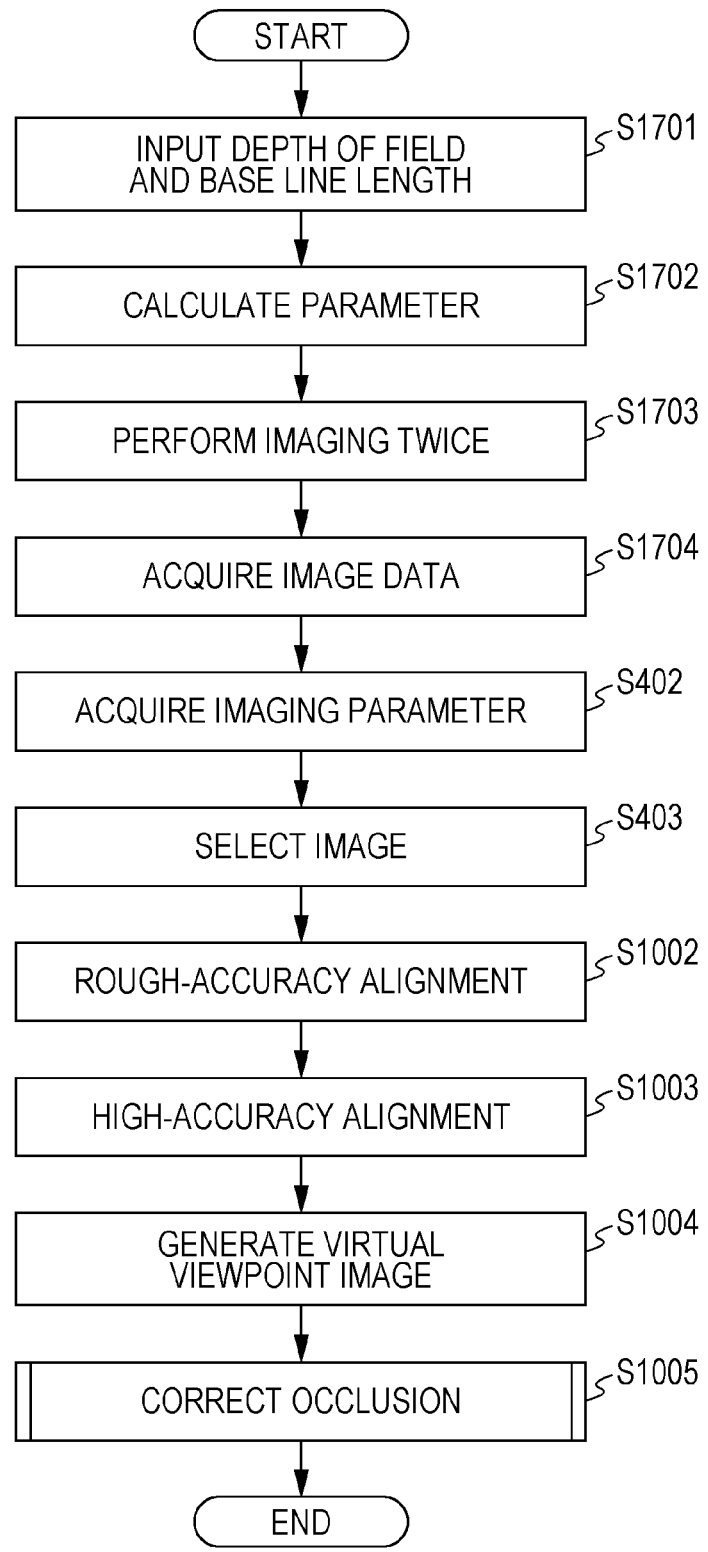

FIG. 19A

| DISTANCE FROM FOCUS PLANE [mm] | BLUR FILTER |
|---|---|
| . . . . | . . . . |
| −5 | $h_1(x, y)$ |
| −4 | $h_2(x, y)$ |
| −3 | $h_3(x, y)$ |
| −2 | $h_4(x, y)$ |
| −1 | $h_5(x, y)$ |
| 0 | $h_6(x, y)$ |
| 1 | $h_7(x, y)$ |
| . . . . | . . . . |

FIG. 19B

| 0.1 | 0.25 | 0 |
|---|---|---|
| 0.1 | * | 0.25 |
| 0.2 | 0 | 0.1 |

IMAGE PROCESSING APPARATUS, IMAGING APPARATUS, IMAGE PROCESSING METHOD AND PROGRAM

BACKGROUND OF THE INVENTION

Field of the Invention

The present invention relates generally to image processing, and more particularly it relates to a technology for searching corresponding image regions between images having different blurred states.

Description of the Related Art

In image processing, methods have been known which use two or more images captured under different photographing conditions to acquire a distance to a subject (hereinafter, called a subject distance) and may use the acquired subject distance to generate a new image as if it has been captured under a different condition from conditions under which the images have been actually captured. Block matching is a typical one of those methods and may search corresponding points being corresponding pixels between two or more images acquired by photographing a same subject from different points of view to acquire a parallax between the images. The parallax between images acquired by block matching and positional information on positions of points of view where the images are photographed if known may be used to acquire a distance to the subject by using simple trigonometry. An improved method of such block matching has been proposed, for example, by Japanese Patent Application Laid-Open No. 2009-293970. In this improved block matching method, image processing adaptively changes a block size of search blocks for searching corresponding points in accordance with whether the search block includes edge areas of the image or not for higher accuracy of search for corresponding points.

The method disclosed in Japanese Patent Application Laid-Open No. 2009-293970, however, may possibly lower the accuracy of search for corresponding points between images captured at different point-of-view positions and having different blurred states (in-focus states) due to a difference in focal length, f-number or focused position if any. The term "blurred state" here refers to a parameter for determining a blur (deviation) of an image with respect to an in-focus position or a depth of field.

SUMMARY OF THE INVENTION

Embodiments of the present invention describe methods and apparatuses for searching corresponding image regions between images having different blurred states. Specifically, an image processing apparatus according to the present invention includes an acquiring unit configured to acquire a first image of a subject viewed from a first point of view and a second image that is an image of the subject viewed from a second point of view different from the first point of view, wherein the first image and the second image have different blurred states from each other, a processing unit configured to change the blurred state of at least one of the first image and the second image, and a determining unit configured to compare the first image and the second image after the blurred state of at least one of the first image and the second image is changed by the processing unit to determine image regions corresponding to the same subject between the first image and the second image.

Further features of the present invention will become apparent from the following description of exemplary embodiments with reference to the attached drawings.

BRIEF DESCRIPTION OF THE DRAWINGS

FIG. 17 is a flowchart illustrating a process or algorithm to be executed by the image processing unit according to the third exemplary embodiment.

FIGS. 19A and 19B illustrate examples of a blur filter database.

DESCRIPTION OF THE EMBODIMENTS

First Exemplary Embodiment

A first exemplary embodiment will be described by assuming a case where information on a distance to a subject is to be acquired from images captured with a stereo camera having two image capturing units with different focal lengths.

Figure 1:
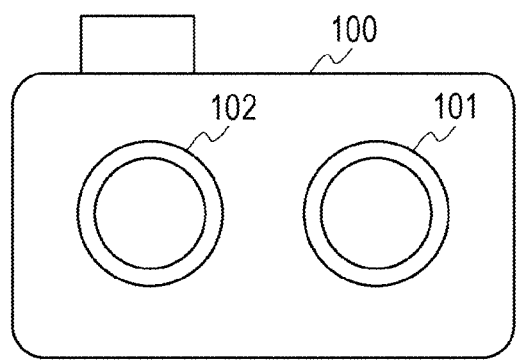
FIG. 1 illustrates an appearance of a camera according to a first exemplary embodiment.

FIG. 1 illustrates an appearance of a stereo camera 100 (hereinafter, called a camera 100) according to the first exemplary embodiment. The camera 100 has two image capturing units 101 and 102. The two image capturing units 101 and 102 are disposed on a same plane of a housing. The optical axes of the image capturing units 101 and 102 are parallel to each other, and are perpendicular to the plane where the image capturing units are disposed. Each of the image capturing units includes a zoom lens, a focus lens, a shake correction lens, an aperture, a shutter, an optical low pass filter, an IR (infra-red) cut filter, a polychrome filter, and an image sensor such as a CMOS sensor or a CCD sensor which detects the light amount of a subject and outputs it as digital data. The image capturing units 101 and 102 have similar structural configurations. However, the image capturing unit 101 is a wide-angle image capturing unit while the image capturing unit 102 is a telephotograph image capturing unit with a larger focal length than that of the image capturing unit 101.

Figure 2:
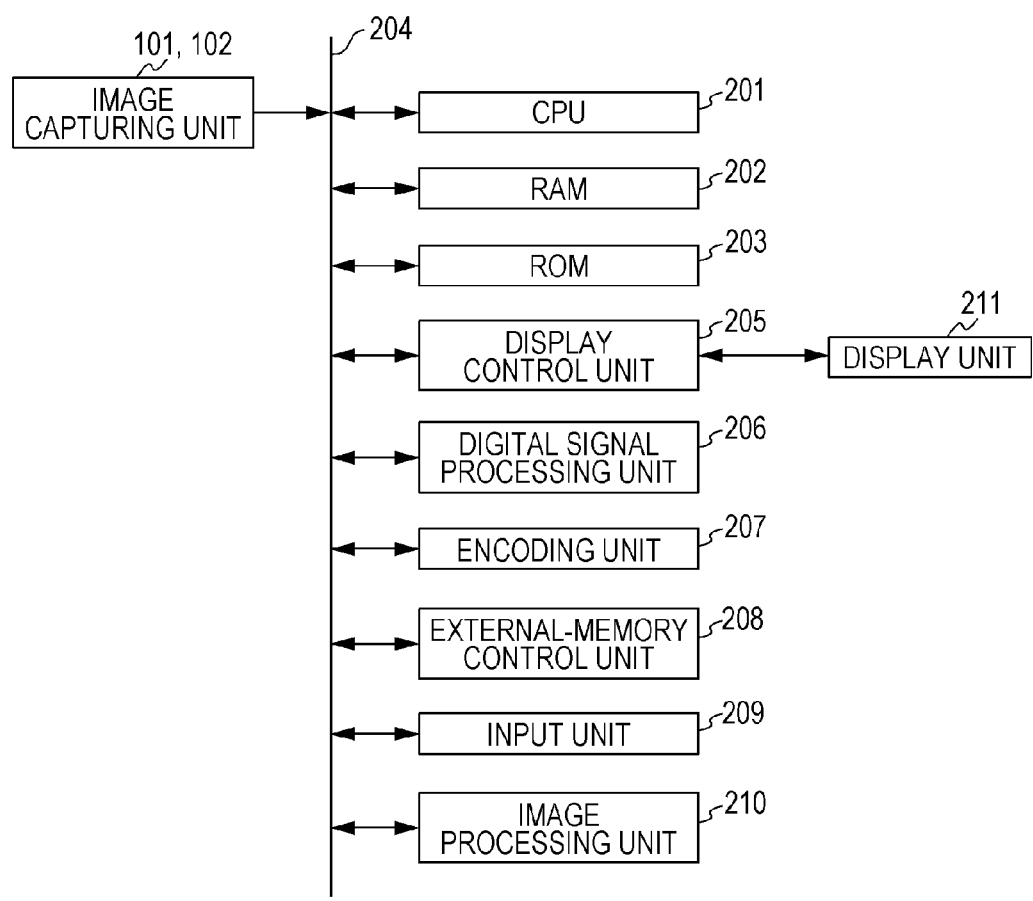
FIG. 2 illustrates a configuration of functional blocks of hardware and software of the camera according to the first exemplary embodiment.

FIG. 2 illustrates an internal configuration of the hardware and/or software elements that form the camera 100. The CPU 201 is a processor (microprocessor) which generally controls components which will be described below. A RAM 202 is a memory serving as a main memory and as a work area for the CPU 201. A ROM 203 is a memory configured to store a control program to be executed by the CPU 201. The CPU 201 executes a program stored in the ROM 203 by using the RAM 202 as a work memory and controls components of the camera 100 via a bus 204.

The bus 204 serves as a circuit path for transferring data. For example, image data output from the image capturing units 101 and 102 are transmitted to the corresponding components via the bus 204. A display control unit 205 is a processing circuit which performs display control over an image and text to be displayed on a display unit 211 such as a liquid crystal display. A digital signal processing unit 206 is a processing circuit which performs a process such as white balance processing, gamma processing, and noise reduction processing on image data received via the bus 204.

Figure 3:
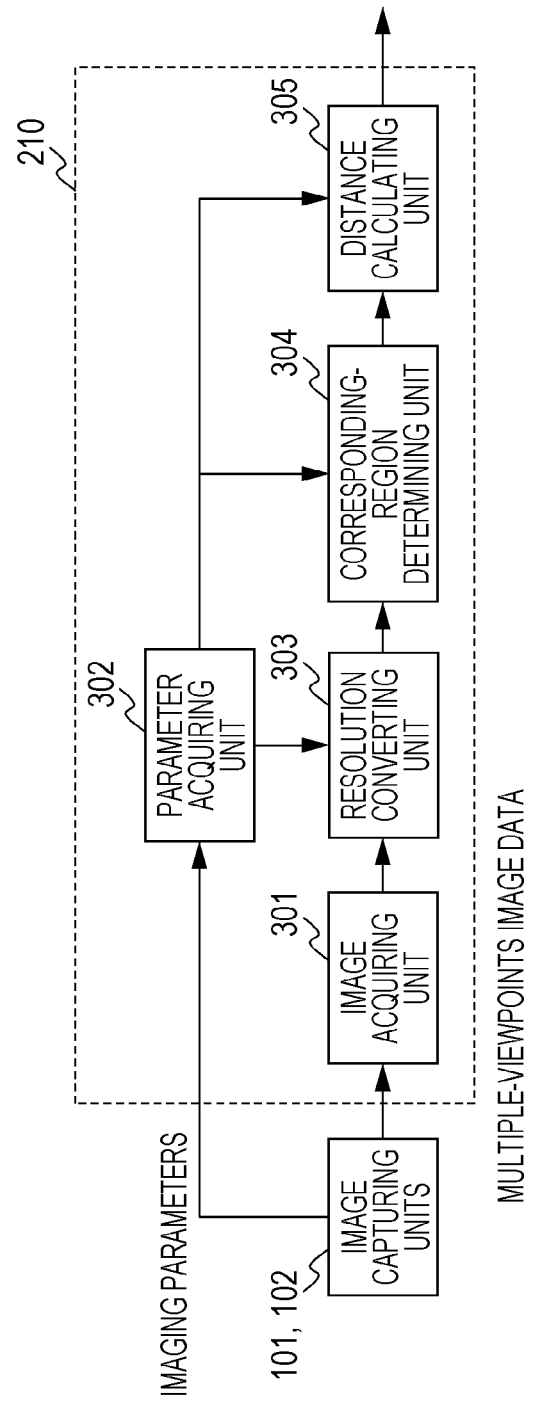
FIG. 3 illustrates a configuration of functional blocks of hardware and/or software of an image processing unit according to the first exemplary embodiment.

An encoding unit 207 is a processing circuit which performs a process for converting image data received via the bus 204 to a file format such as JPEG and MPEG (JPEG: Joint Photographic Experts Group; MPEG: Moving Picture Experts Group). An external-memory control unit 208 is an interface usable for connecting the camera 100 to an external memory such as a hard disk, a memory card, a CF card, an SD card, and a USB memory. An input unit 209 (may also be referred to as user-interface or user-input unit) is an input device such as a multi-use button and a dial provided on the camera 100. A user may use the input unit 209 to set an imaging timing and an imaging parameter. The image processing unit 210 is a processing circuit which performs a process using image data such as distance calculation from image data. FIG. 3 illustrates a configuration of the image processing unit 210. The image processing unit 210 includes, and functions as, an image acquiring unit 301, a parameter acquiring unit 302, a resolution converting unit 303, a corresponding-region determining unit 304, and a distance calculating unit 305.

Figure 4:
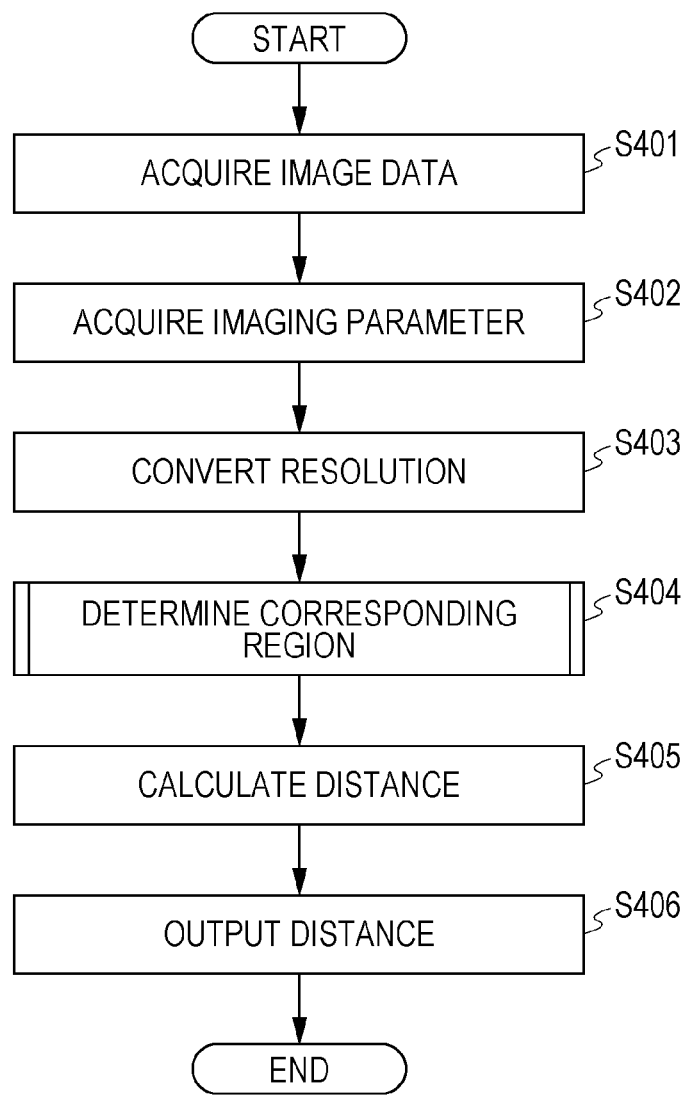
FIG. 4 is a flowchart illustrating a process or algorithm to be executed by the image processing unit according to the first exemplary embodiment.

According to this exemplary embodiment, the ROM 203 stores a program for performing processing illustrated in the flowchart in FIG. 4. The CPU 201 may execute programs stored in the ROM 203 so that the image processing unit 210 is caused to function as the components illustrated in FIG. 3. Processing to be performed in the image processing unit 210 will be described with reference to the flowchart illustrated in FIG. 4.

Processing in Image Processing Unit

First, in step S401, the image acquiring unit 301 acquires image data output from the image capturing units 101 and 102. The image acquiring unit 301 outputs the acquired image data to the resolution converting unit 303.

Next, in step S402, the parameter acquiring unit 302 acquires imaging parameters from the image capturing units 101 and 102. The imaging parameters may include a focal length, an f-number, an in-focus position, positional coordinates of points of view, and a sensor size to be applied for imaging. The parameter acquiring unit 302 outputs the acquired imaging parameters also to the resolution converting unit 303.

Next, in step S403, the resolution converting unit 303 acquires angles of view of the images acquired in step S401 based on the imaging parameters acquired in step S402 and performs cropping and resolution conversion such that the images may have an equal angle of view and an equal resolution. The processing will be described below.

Figure 5:
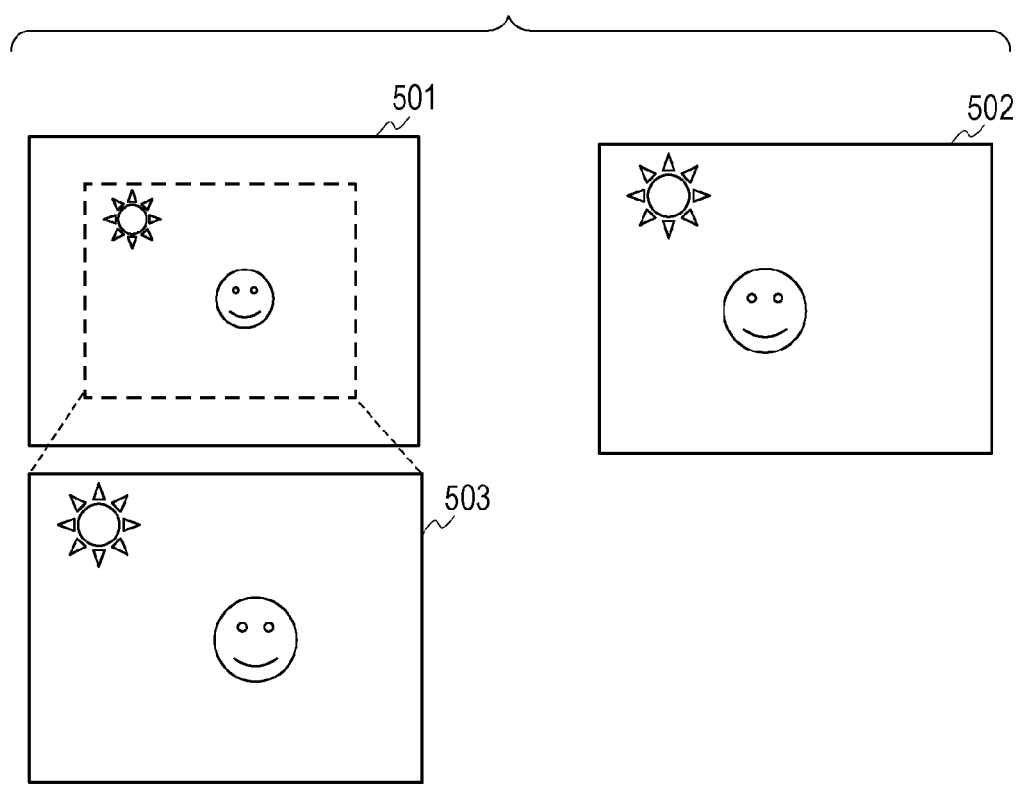
FIG. 5 illustrates a resolution conversion process according to the first exemplary embodiment.

First, the resolution converting unit 303 performs cropping and enlargement on wide-angle images captured by the image capturing unit 101 such that the images may have an equal angle of view. FIG. 5 illustrates an outline of the processing. An image 501 is a wide-angle image captured by the image capturing unit 101, and an image 502 is a telephotograph image captured by the image capturing unit 102. In this case, the resolution converting unit 303 may crop a range having an equal angle of view to that of the image 502 from a center part of the image 501 and enlarge it to an equal size to that of the image 502 to generate an image 503.

Here, the image 503 is an image having a lower resolution than that of the image 502. For easy matching between the images, a filter is applied to the image 502 having a higher resolution to reduce its resolution so that they may have an equal resolution. According to this exemplary embodiment, the image 502 is applied with a Gaussian filter defined by Expression (1):

$$h(x, y) = \frac{1}{2\pi\sigma^2}\exp\{-(x^2+y^2)/(2\sigma^2)\} \qquad (1)$$

$$\sigma \equiv \frac{fD}{f_{base}}$$

Here, x and y are pixel positions in an image, and D is an appropriate fixed number. $f_{base}$ is a value of a focal length of the image 503 to be referred for the resolution conversion, and f is a value of a focal length of the image 502 subject to the resolution conversion. After the resolution conversion is performed, the resolution converting unit 303 outputs image data after the resolution conversion to the corresponding-region determining unit 304.

Next, in step S404, after the resolution conversion, the corresponding-region determining unit 304 determines image regions of image 503 captured by the image capturing unit 101 corresponding to image regions of image 502 captured by image capturing unit 102, or vice versa. Details of this processing will be described below.

Next, in step S405, the distance calculating unit 305 calculates distance information to the subject based on the corresponding image regions determined in step S404. In step S404, a parallax d [pixel] between a standard image and a reference image corresponding to a pixel is calculated by Expression (2):

$$d = \frac{Lf_R}{s\Delta} \qquad (2)$$

where L is a base-line length between the image capturing unit 101 and the image capturing unit 102, $f_R$ is a focal length of the image capturing unit 102, s is a distance from the camera 100 to a subject, and Δ is a pixel pitch between the image capturing units 101 and 102.

The distance calculating unit 305 substitutes the imaging parameters output from the parameter acquiring unit 302 and the parallax d output from the corresponding-region determining unit 304 into Expression (2) to calculate a subject distance corresponding to the pixel.

Finally, in step S406, the distance calculating unit 305 outputs the distance information calculated in step S405 to the bus 204. The distance information output here includes a distance map that is image data in which subject distance information corresponding to pixel positions are aligned two-dimensionally. The output distance map may be stored in an external memory and be displayed on the display unit 211.

The outline of the processing to be performed in the image processing unit 210 has been described. Next, processing to be performed in the corresponding-region determining unit 304 will be described.

Processing in Corresponding-Region Determining Unit

The corresponding-region determining unit 304 performs block matching between two images having different focal lengths to determine image regions corresponding to a same subject between the two images. According to this exemplary embodiment, because the image capturing units which have captured the two images have different focal lengths, the resulting images have different depths of field. Performing block matching directly on images having different depths of field may possibly result in occurrence of incorrect correspondence from matching between the images having difference blurred states. According to this exemplary embodiment, block matching is performed by adding a blur similar to a blur of one image to another image having a higher depth of field for more accurate matching.

A method for performing block matching according to this exemplary embodiment will be described below. In block matching, one image is defined as a standard image for deriving a corresponding region, and an image region corresponding to the image region in the standard image is searched in a reference image. According to this exemplary embodiment, an image captured by the telephotograph image capturing unit 102 is defined as a standard image, and an image captured by the wide-angle image capturing unit 101 is defined as a reference image. It is assumed that the point-of-view position of the standard image is at position (0, 0), and the point-of-view position of the reference image is at (L, 0), and the coordinates of a pixel of interest in the standard image are (x, y), and the coordinates of a pixel to be searched in the reference image are (x+d, y). In this case, matching is performed between a block B=[x−S, x+S]×[y−S, y+S] of the standard image and a block B'=[x+d−S, x+d+S]×[y−S, y+S] of the reference image.

For matching, blocks having a highest similarity level are determined as corresponding blocks. According to this exemplary embodiment, d [pixel] which provides a minimum value in the following expression (3) is determined as d indicative of a corresponding image region. The value d indicates a parallax between the standard image and the reference image in searched pixel position.

$$V = \frac{1}{|B|} \sum_{(x',y') \in B} \sum_{i=L,R} \left[ I_i(x'+d, y') - \frac{I_L(x'+d, y') + I_R(x', y')}{2} \right]^2 \quad (3)$$

Here, |B| is the number of pixels contained in the block B, $I_R$ is a pixel value of the standard image, $I_L$ is a pixel value of the reference image, and V is a variance value between the standard image and the reference image. Having described that a variance value is used as a reference for determining a similarity level between blocks, a sum of absolute values of differences or a sum of squares of differences may be used. According to this exemplary embodiment, the matching based on Expression (3) is performed by adding a blur to the reference image in accordance with the value of d indicative of a searched position. The method will be described below.

According to this exemplary embodiment, it is assumed that both of the image capturing unit 101 and image capturing unit 102 are in focus at an equal distance. A diameter b [pixel] of a blur of a subject at a distance s viewed from a camera may be expressed by Expression (4):

$$b = \frac{f^2}{F\Delta} \left| \frac{1}{s} - \frac{1}{s_{pint}} \right| \quad (4)$$

where $s_{pint}$ is a distance from the camera to a focus position, f is a focal length of a lens, F is an f-number of the lens, and Δ is a pixel pitch.

Therefore, a diameter $b_R$ of a blur corresponding to the standard image and a diameter $b_{L'}$ of a blur corresponding to the reference image after the resolution conversion is performed are defined by Expression (5) below:

$$b_R = \frac{f_R^2}{F_R\Delta} \left| \frac{1}{s} - \frac{1}{s_{pint}} \right| \quad b_{L'} = \frac{f_R f_L}{F_L\Delta} \left| \frac{1}{s} - \frac{1}{s_{pint}} \right| \quad (5)$$

where $f_R$ is a focal length and $F_R$ is an f-number of a lens of the image capturing unit 102, and $f_L$ is a focal length and $F_L$ is an f-number of a lens of the image capturing unit 101.

Converting Expression (5) based on Expression (2), $b_R'$ and $b_L$ may be expressed by Expression (6):

$$b_R = \frac{f_R}{F_R L} |d - d_{pint}| \quad b_{L'} = \frac{f_L}{F_L L} |d - d_{pint}| \quad (6)$$

$d_{pint}$ is a value acquired by substituting $s_{pint}$ to s in Expression (2). $s_{pint}$ may be calculated from a sensor position when an imaging operation is performed.

Thus, a filter expressed by Expression (7) below may be applied to blocks of the reference image in accordance with the parallax d to be searched so that a similar blur to that of the telephotograph image that is the reference image may be added. In other words, the degree or amount of blur to be added to blocks may be determined based on a positional relationship between a reference block in the standard image and the reference block in the reference image.

$$g_i(x, y, d) = \frac{1}{2\pi\sigma_i^2} \exp\{-(x^2 + y^2)/(2\sigma_i^2)\} \quad (7)$$

$$\sigma_i \equiv \frac{1}{L} \left| \frac{f_L}{F_L} - \frac{f_R}{F_R} \right| |d - d_{pint}|$$

According to this exemplary embodiment, block matching is performed by applying the filter expressed by Expression (7) to the reference image so that corresponding points may be searched with higher accuracy. According to this exemplary embodiment, a pixel value to which the filter expressed by Expression (7) has been applied may be substituted to Expression (3). The parallax d which provides a minimum value of V expressed in Expression (3) may be determined as a correct d. In other words, a search position which provides a minimum value of V is determined as a corresponding image region. This processing to be performed here is not limited to the addition of a blur but may be a deconvolution process. The blur addition to be performed here is not limited to blur addition to either one of the images but may be blur addition to both of the images.

Figure 6:
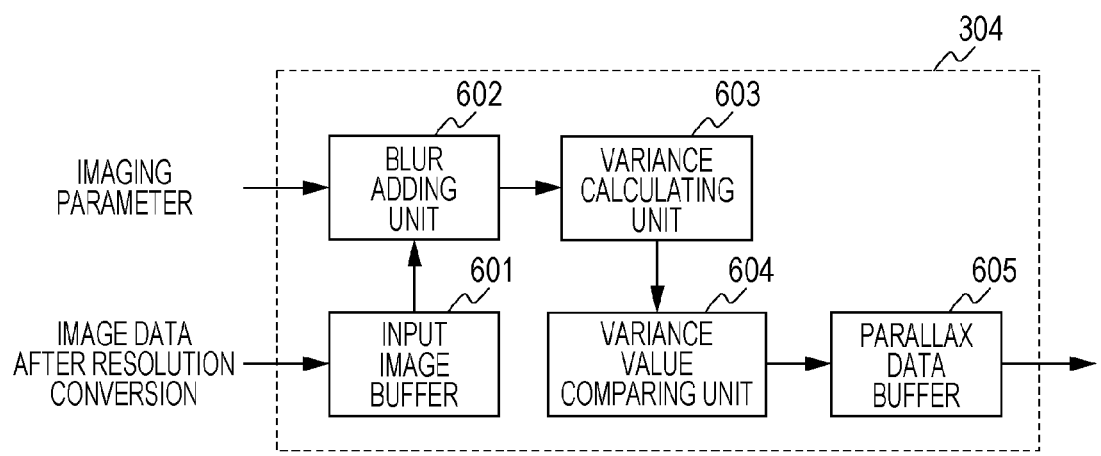
FIG. 6 illustrates a configuration of a corresponding-region determining unit according to the first exemplary embodiment.
Figure 7:
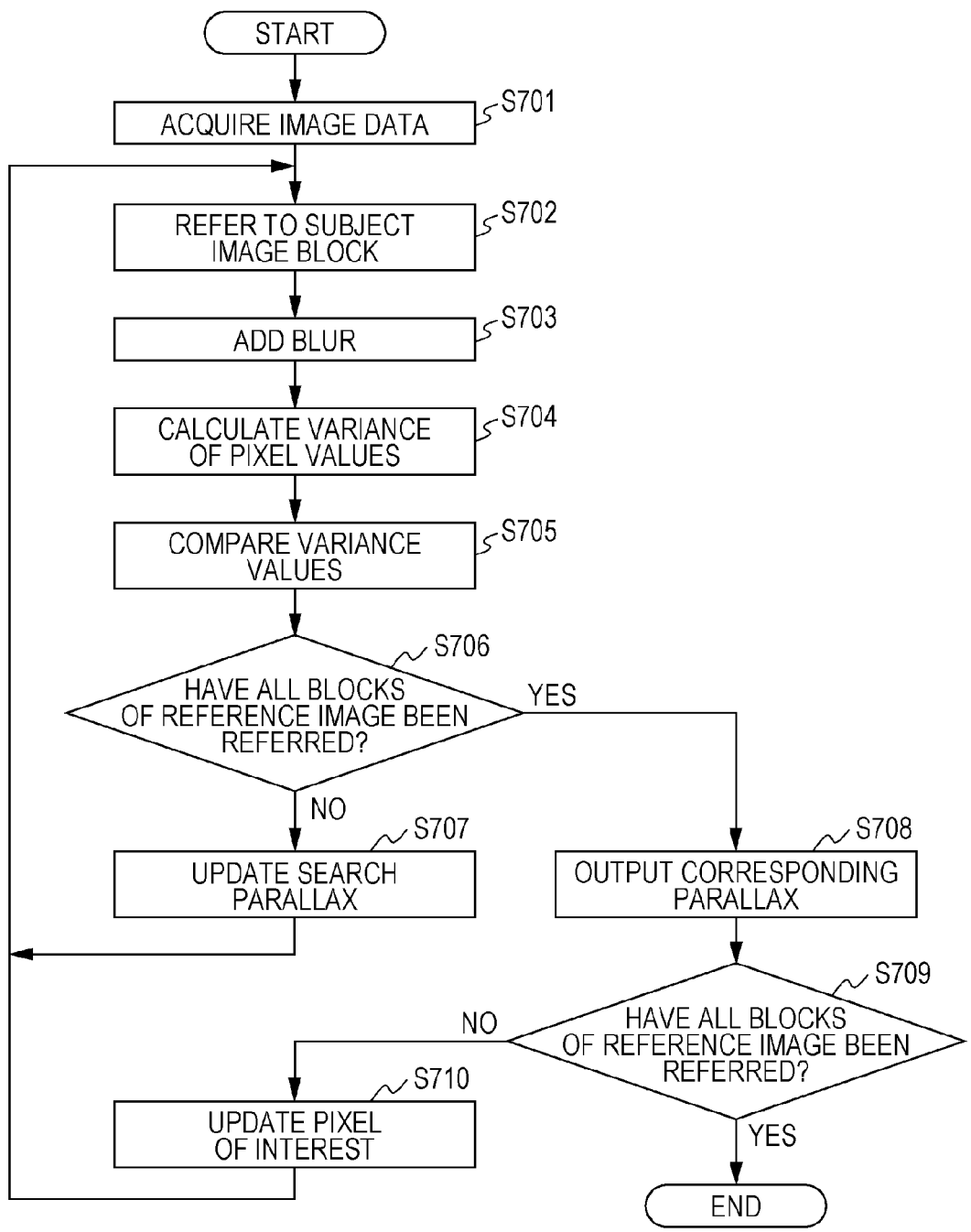
FIG. 7 is a flowchart illustrating a flow of a process or algorithm to be executed by the corresponding-region determining unit according to the first exemplary embodiment.

Processing to be performed in the corresponding-region determining unit according to this exemplary embodiment will be described with reference to the block diagram illustrated in FIG. 6 and the flowchart illustrated in FIG. 7.

First, in step S701, an input image buffer 601 acquires image data after the resolution conversion data is output from the resolution converting unit 303.

Next, in step S702, a blur adding unit 602 reads out an image block to be processed from image data acquired by the input image buffer 601. In this case, an image block to be read out is determined based on coordinate information describing a standard image block to be referred for matching in a standard image stored in the RAM 202 and a search parallax $d_s$ corresponding to a reference image block to be searched in a reference image. Initially, the coordinates of a center pixel (pixel of interest) in the standard image block is set at (0, 0), and $d_s$=0 is set.

Next, in step S703, the blur adding unit 602 substitutes imaging parameters acquired from the parameter acquiring unit 302 and $d_s$ corresponding to the reference image block into d in Expression (7). The calculated filter is applied to the reference image block to add the corresponding blur. The information on a pixel value to which the blur has been added is output to a variance calculating unit 603.

Next, in step S704, the variance calculating unit 603 substitutes the pixel value of the reference image block having the added blur to Expression (2) to calculate a variance V of the pixel value corresponding to the parallax $d_s$ and outputs it and the corresponding parallax $d_s$ to a variance-value comparing unit 604.

Next, in step S705, the variance-value comparing unit 604 compares the variance V output from the variance value computing unit 603 with the variance V stored in the RAM 202. If the variance V output from the variance value computing unit 603 is lower than the variance V stored in the RAM 202, the value of the corresponding parallax $d_c$ stored in the RAM 202 is replaced by the value of the searched parallax $d_s$ output from the variance value computing unit 603. The value of the variance V stored in the RAM 202 is also updated.

Here, the corresponding parallax $d_c$ is parallax information describing the position of a reference image block determined as an image block corresponding to the standard image block. Initially, the RAM 202 does not store V and $d_c$. In that case, V and $d_s$ output from the variance value computing unit 603 are unconditionally stored in the RAM 202. By performing the process in step S705 on all pixels, an optimum value of $d_c$ is finally determined.

Next, in step S706, the variance-value comparing unit 604 determines whether the variance values V have been calculated for all reference pixel blocks or not is determined. If so, the processing moves to step S708. If not, the processing moves to step S707.

In step S707, the variance-value comparing unit 604 updates the value of $d_s$ stored in the RAM 202. Returning to step S702, the blur adding unit 602 restarts the process based on the new $d_s$.

In step S708, the variance-value comparing unit 604 determines that the $d_c$ stored in the RAM 202 is a current correct $d_c$ and outputs the $d_c$ determined as a correct value and coordinates of the pixel corresponding to the $d_c$ to a parallax data buffer 605. In other words, the value of $d_c$ output here is a value determined as $d_c$ indicating the position of a corresponding image block.

Next, in step S709, the variance-value comparing unit 604 determines whether the determination of the corresponding parallax $d_c$ has been performed on all pixels in the standard image or not. If so, the processing ends. If it is determined that the subject distance has not been calculated for all pixels, the processing moves to step S710.

In step S710, the variance-value comparing unit 604 updates coordinates of the pixel of interest stored in the RAM 202 and updates the value of $d_s$ to 0. Returning to step S702, the blur adding unit 602 restarts the same processing on another pixel of interest.

The processing to be performed in the corresponding-region determining unit 304 has been described. This processing allows highly accurate determination of corresponding points between images having both different blurred states and different points of view. As a result, the subject distance may be acquired with higher accuracy.

According to this exemplary embodiment, the image acquiring unit 301 functions as an acquiring unit configured to acquire a first image of a subject viewed from a first point of view and a second image that is an image of the subject viewed from a second point of view different from the first point of view and having a different blurred state from that of the first image. The blur adding unit 602 functions as a processing unit configured to change a blurred state of at least one of the first image and the second image.

The variance-value comparing unit 604 functions as a determining unit configured to compare the first image and the second image after the blurred state or states is or are changed by the processing unit to determine image regions corresponding to a same subject between the first image and the second image. The distance calculating unit 305 functions as a deriving unit configured to derive distance information on the subject based on the corresponding image regions between the first image and the second image, which is determined by the determining unit.

Second Exemplary Embodiment

According to the first exemplary embodiment, a result of block matching by adding a blur is used to acquire a subject distance with high accuracy. According to a second exemplary embodiment, a result of block matching by adding a blur is used to generate a virtual viewpoint image.

Figure 8:
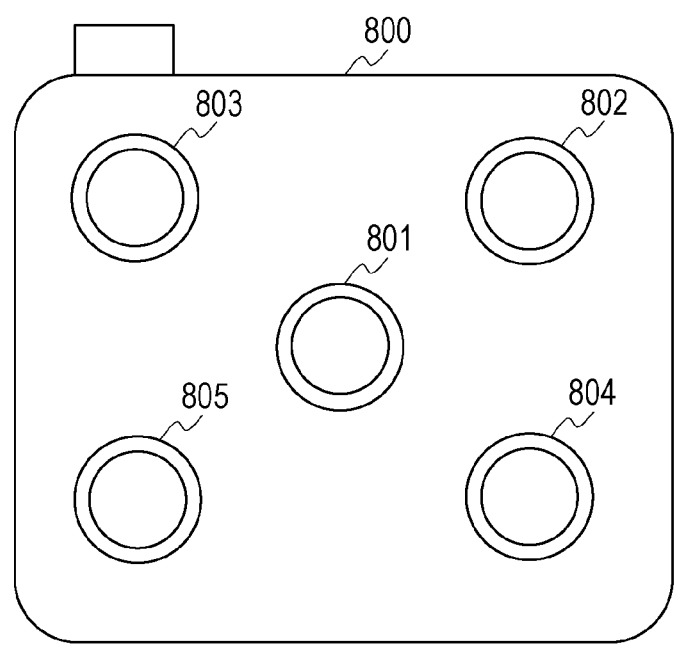
FIG. 8 illustrates an appearance of a camera according to a second exemplary embodiment.

FIG. 8 illustrates an appearance of an array camera 800 (hereinafter called a camera 800) according to the second exemplary embodiment. The camera 800 has five image capturing units 801 to 805. The five image capturing units are all disposed on a same plane of a housing and have optical axes that are all parallel with each other and are perpendicular to the plane where they are disposed. The configuration of each of the image capturing units 801 to 805 is fundamentally same as that of the image capturing units 101 and 102. However, According to this exemplary embodiment, the image capturing unit 801 is a wide-angle image capturing unit, and the image capturing units 802 to 805 are telephotograph image capturing units. The telephotograph image capturing units have lenses all having an equal focal length. Assuming that the point-of-view position of the image capturing unit 801 is (0, 0), the image capturing units 802 to 805 are disposed such that their point-of-view positions are (L, L), (−L, L), (L, −L), and (−L, −L), respectively.

Figure 9:
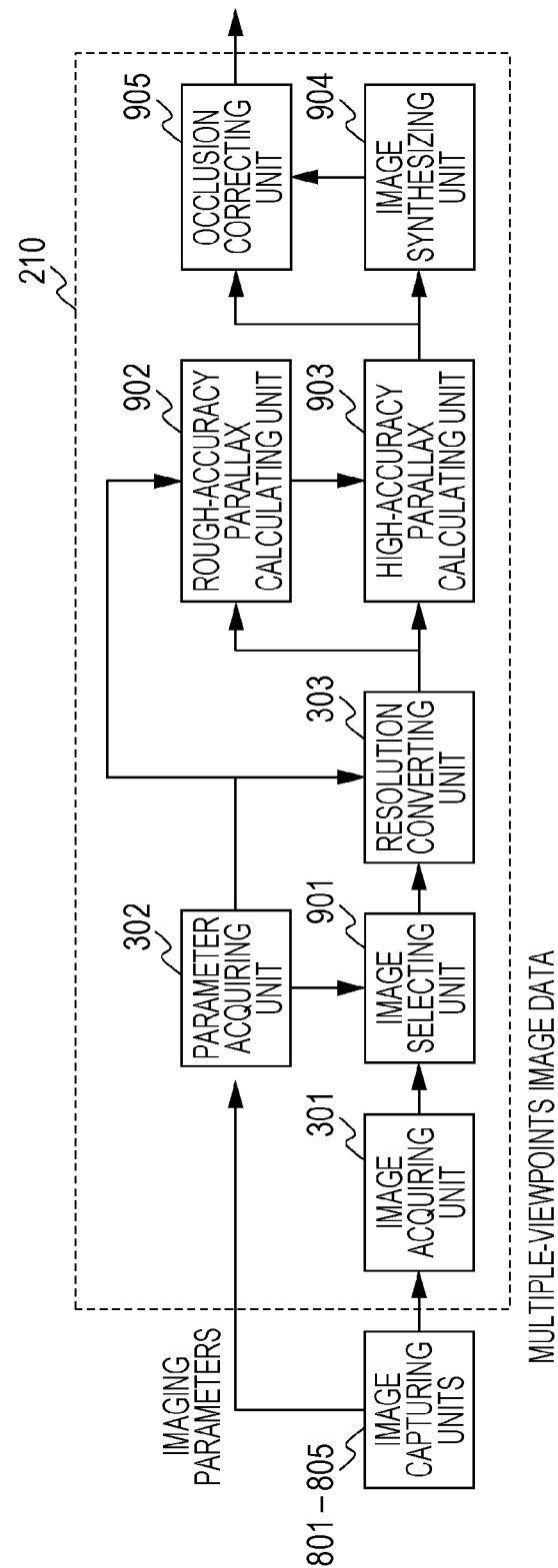
FIG. 9 illustrates a configuration of an image processing unit according to a second exemplary embodiment.

The camera 800 has an internal configuration that is fundamental same as the internal configuration of the camera 100 illustrated in FIG. 2 except for a configuration of the image processing unit 210. FIG. 9 illustrates a configuration of the image processing unit 210 according to this exemplary embodiment.

The image processing unit 210 according to this exemplary embodiment further includes an image selecting unit 901, a rough-accuracy parallax calculating unit 902, a high-accuracy parallax calculating unit 903, an image synthesizing unit 904 and an occlusion correcting unit 905.

Figure 10:
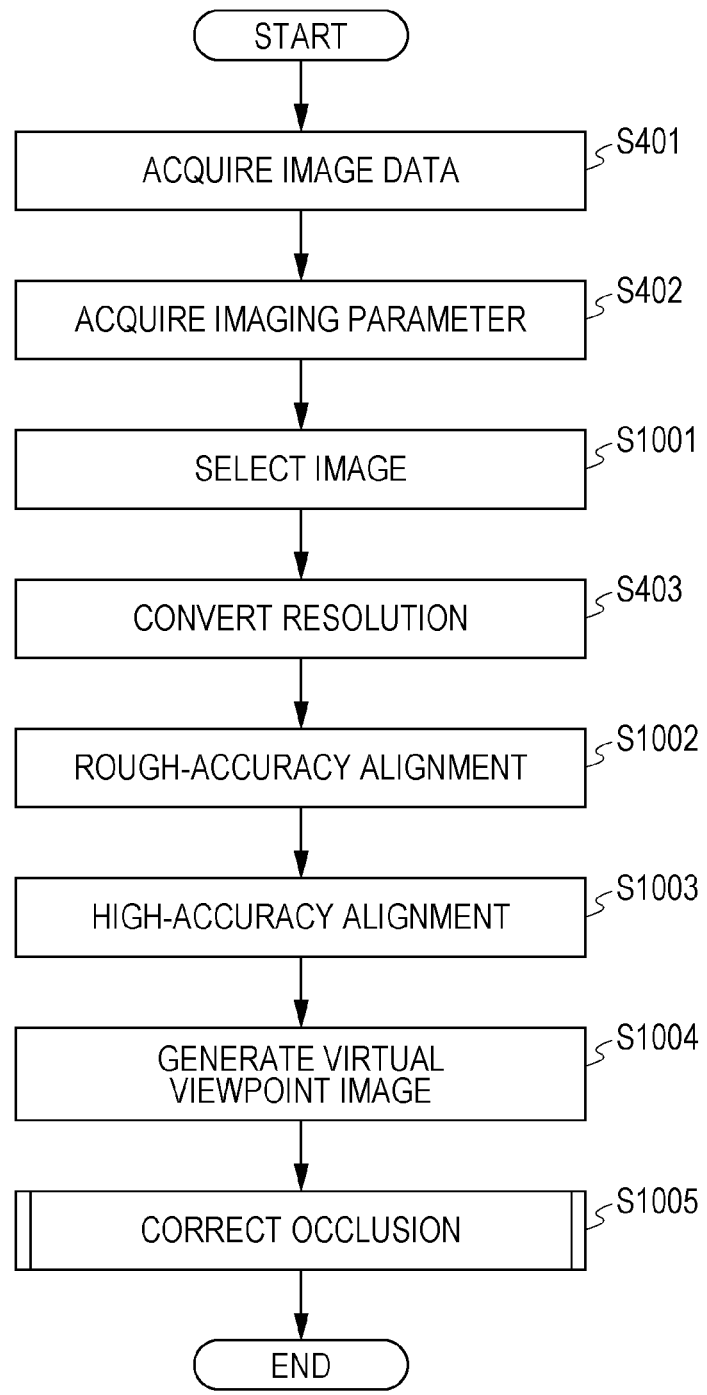
FIG. 10 is a flowchart illustrating a process or algorithm to be executed by the image processing unit according to the second exemplary embodiment.

Processing to be performed in the image processing unit 210 according to this exemplary embodiment will be described with reference to the flowchart illustrated in FIG. 10.

The same numbers as those in FIG. 4 refer to the same processes as those of the first exemplary embodiment, and the description will be omitted.

In step S1001, the image selecting unit 901 selects an image to be used in subsequent processes based on the point-of-view position and focal length of a virtual viewpoint image designated by a user and outputs the selected image to the resolution converting unit 303. According to this exemplary embodiment, shift synthesis is performed on images having close focal lengths to generate a virtual viewpoint image. In this case, the shift amounts of images to be used for the synthesis are determined by using an image with a point of view close to the virtual viewpoint as a guide so that a virtual viewpoint image closer to an actual scene may be generated.

In this case, the image selecting unit 901 selects synthesis images to be synthesized to generate a virtual viewpoint image and a guide image to be used as a guide for performing matching. According to this exemplary embodiment, images captured at an equal focal length to those of the image capturing units 802 to 805 are generated from the point of view of the image capturing unit 801. Thus, an image captured by the image capturing unit 801 is selected as a guide image, and images captured by the image capturing units 802 to 805 are selected as synthesis images. The image selecting unit 901 acquires the selected images from the image acquiring unit 301 and outputs them to the resolution converting unit 303.

Next, in step S403, like the first exemplary embodiment, a process is performed which adjusts resolutions of a wide-angle image and telephotograph images to be equal. The group of images having an equal resolution is output to the rough-accuracy parallax calculating unit 902.

Next, in step S1002, the rough-accuracy parallax calculating unit 902 uses the guide image to calculate a parallax from the virtual viewpoints of the synthesis images with rough accuracy. Details of this process will be described below. The parallax calculated with rough accuracy is output to the high-accuracy parallax calculating unit 903.

Next, in step S1003, the high-accuracy parallax calculating unit 903 performs matching between the synthesis images based on the parallax calculated with rough accuracy in step S1002 to calculate a parallax from the virtual viewpoint with high accuracy. Details of the process will be described below. The parallax calculated with high accuracy is output to the image synthesizing unit 904. The high-accuracy parallax calculating unit 903 outputs the parallax calculated here and a variance value corresponding thereto to the occlusion correcting unit 905.

Next, in step S1004, the image synthesizing unit 904 performs shift synthesis on the synthesis images based on the value of the parallax calculated in step S1003.

Next, in step S1005, the occlusion correcting unit 905 corrects an occlusion part of the virtual viewpoint image generated in step S1004. Details of this process will be described below.

Finally, after step S1005 is completed, the generated virtual viewpoint image is output. Then, the processing ends. The processing flow in the image processing unit 210 according to this exemplary embodiment has been described above. Details of steps of the processing will be described below. First, the process (step S1002) to be performed in the rough-accuracy parallax calculating unit 902 will be described.

The process to be performed in the rough-accuracy parallax calculating unit 902 is fundamentally similar to the process performed in the corresponding-region determining unit 304 according to the first exemplary embodiment. In other words, the rough-accuracy parallax calculating unit 902 has similar components as those of the corresponding-region determining unit 304. However, because more images are to be used for calculating a parallax here, Expression (3) will be extended as follows. Assuming that the parallax at the point-of-view position (L,L) is (d,d) and the position vector indicated by a ratio of the positions of the point of views to L is $(v_x, v_y)$, the variance used in this exemplary embodiment may be expressed by Expression (8):

$$V = \frac{1}{|B|(M-1)} \sum_{(x',y') \in B} \sum_{i=1}^{M} \left[ J_i(x' + v_{xi}d, y' + v_{yi}d) - \frac{1}{M}\sum_{i=1}^{M} J_i(x' + v_{xi}d, y' + v_{yi}d) \right]^2 \quad (8)$$

Here, |B| is the number of pixels contained in a block, J(x, y) is a pixel value of each image also including a guide image after the resolution conversion, i is a number indicating the image capturing unit corresponding to the image, and M is the number of images to be used for block matching. In this case, because all images captured by the image capturing units 801 to 805 are to be used, M=5 is defined.

In the same manner, blur filters to be applied to the images are converted as follows. The filter $g_i$ to be applied to an image is expressed by Expression (9):

$$g_i(x, y, d) = \frac{1}{2\pi\sigma_i^2} \exp\{-(x^2 + y^2)/(2\sigma_i^2)\} \quad (9)$$

$$\sigma_i \equiv \frac{1}{L}\left|\frac{f_i}{F_i} - \frac{f_{base}}{F_{base}}\right| |d - d_{pint}|$$

where $f_{base}$ is the focal length of an image having a largest blur among images to be used for block matching, and $F_{base}$ is an f-number, and $f_i$ and $F_i$ are a focal length and an f-number of the image.

The rough-accuracy parallax calculating unit 902 outputs d with which provides a minimum variance V acquired by applying the blur filter $g_i$ expressed by Expression (9) to the images and substituting the resulting pixel values to Expression (8) to the high-accuracy parallax calculating unit 903 as the calculated parallax.

Next, the process (step S1003) to be performed in the high-accuracy parallax calculating unit 903 will be described. The process to be performed in the high-accuracy parallax calculating unit 903 is fundamentally similar to the process to be performed in the rough-accuracy parallax calculating unit 902. However, the high-accuracy parallax calculating unit 903 may calculate a more highly accurate parallax because it performs matching between high resolution telephotograph images excluding the guide image. The parallax to be searched here is also limited to a range of 5 pixels before and after the parallax calculated in the rough-accuracy parallax calculating unit 902. This may reduce the possibility for calculation of a wrong parallax by avoiding the parallax to be calculated as other minimum values. The size of the search area in this case may be changed arbitrary in accordance with the size of the image, for example.

Figure 11:
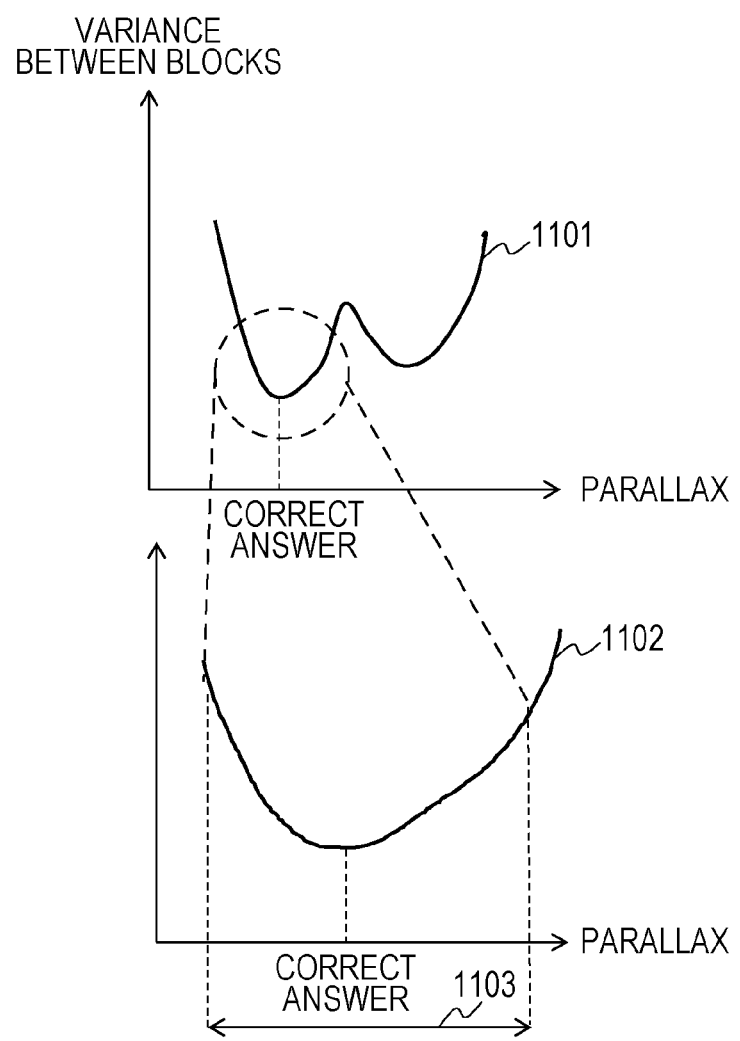
FIG. 11 illustrates a parallax calculation process according to the second exemplary embodiment.

FIG. 11 illustrates an outline of the process. A curved line 1101 represents variance values calculated by the rough-accuracy parallax calculating unit 902, and a curved line 1102 represents variance values calculated by the high-accuracy parallax calculating unit 903. The curved line 1101 is resulted from matching between telephotograph images only and therefore has more detailed steps for pixel positions on the horizontal axis than the curved line 1102.

Referring to the curved line 1101, minimum values appear at two pixel positions. When matching is performed between telephotograph images only, a minimum value different from a correct answer may possibly be acquired. In that case, the image fails. According to this exemplary embodiment, the resulting curved line 1101 may be used to perform matching by limiting a matching range 1103 with telephotograph images so that the pixel positions to be matched are acquired with higher accuracy. Thus, highly accurate matching may be allowed by avoiding wrong minimum values.

Next, the process (step S1004) to be performed in the image synthesizing unit 904 will be described. The image synthesizing unit 904 calculates an addition average of pixel values of pixels corresponding to the four telephotograph images selected as synthesis images in step S1001 to generate a virtual viewpoint image. Assuming the pixel value of the virtual viewpoint image at the pixel (x, y) as $I_{synth}(x, y)$, $I_{synth}(x, y)$ may be expressed by Expression (10):

$$I_{synth}(x, y) = \frac{1}{|W|} \sum_{i \in W} I_i(x + v_{xi}d(x, y), y + v_{yi}d(x, y)) \quad (10)$$

Here, $I_i(x, y)$ is a pixel value of each of the telephotograph images, and W is a set of telephotograph image capturing units. |W| is a number of telephotograph image capturing units included in W. The method for generating a virtual viewpoint image is not limited to a method which calculates an addition average of pixel values of corresponding pixels. A virtual viewpoint image may be generated by using a weighted average of pixel values or by extracting and combining pixel values of specific images.

Next, the process (step S1005) to be performed in the occlusion correcting unit 905 will be described. An image region of a subject that may be viewed from one point of view but is not viewable from other points of view is called an occlusion region. In the occlusion region, no corresponding image regions exist between images. This may result in a larger variance in matching. Even when images are synthesized as they are, the generated image may have a blurred occlusion region.

Figure 12:
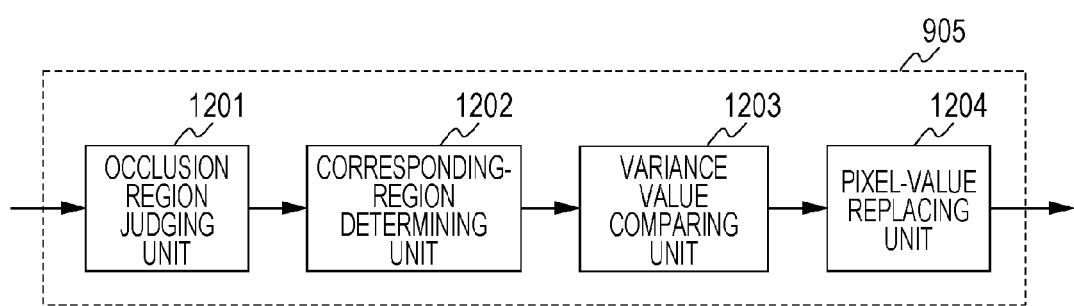
FIG. 12 illustrates a configuration of an occlusion correcting unit according to the second exemplary embodiment.
Figure 13:
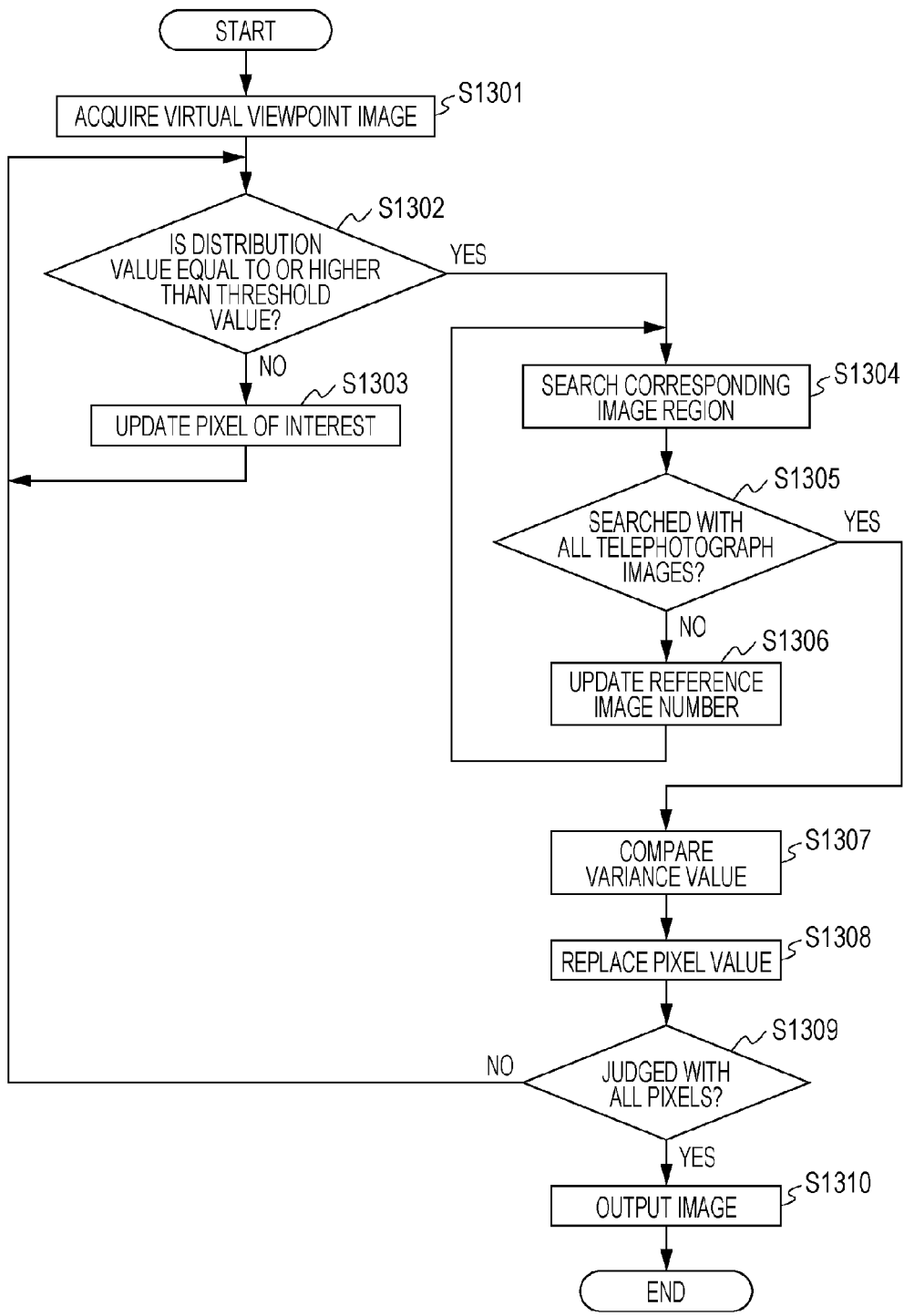
FIG. 13 is a flowchart illustrating a process or algorithm to be executed by the occlusion correcting unit according to the second exemplary embodiment.

Accordingly, the occlusion correcting unit 905 identifies an occlusion region from a value of the variance acquired when the parallax is acquired, and the pixel values of the area corresponding to the occlusion in synthesis images are replaced. Details of this process will be described below with reference to the block diagram illustrated in FIG. 12 and the flowchart illustrated in FIG. 13.

First, in step S1301, an occlusion region judging unit 1201 acquires a virtual viewpoint image output from the image synthesizing unit 904.

Next, in step S1302, whether the value of variance at a pixel of interest in the virtual viewpoint image, which is output from the high-accuracy parallax calculating unit 903, is equal to or higher than a threshold value is judged based on the coordinates of the pixel of interest stored in the RAM 202. Initially, (0, 0) is stored as coordinates of the pixel of interest. If the value of variance is equal to or higher than the threshold value, it is judged that the image block represented by the pixel of interest is an occlusion region. Then, the processing moves to step S1304. If the value of variance is lower than the threshold value, it is judged that the image block represented by the pixel of interest is not an occlusion region. The processing then moves to step S1303. According to this exemplary embodiment, the judgment of an occlusion region is performed with reference to a threshold value of $V=15^2=255$ where the range of pixel values is 0 to 255. The magnitude of the threshold value may be changed arbitrarily in accordance with the photographing environment.

In step S1303, the occlusion region judging unit 1201 updates the pixel of interest information stored in the RAM 202. Then, the processing returns to step S1302.

In step S1304, a corresponding-region determining unit 1202 searches corresponding image regions by defining the guide image used in the process in the rough-accuracy parallax calculating unit as a standard image and one of telephotograph images used for the synthesis as a reference image. The process to be performed here is fundamentally similar to the process performed in step S404 according to the first exemplary embodiment except that matching is performed by adding a blur to a standard image because a wide-angle image is defined as the standard image here. In this case, an image selected as a reference image for matching is determined based on a camera number corresponding to the reference image stored in the RAM 202. Initially, one of numbers of images selected as a synthesis image is stored, and a number indicating the image capturing unit 802 is stored according to this exemplary embodiment. As a result of the matching, the calculated corresponding parallax $d_c$ and the variance V corresponding to the $d_c$ are output to a variance-value comparing unit 1203. In this case, because matching is performed between two images, the variance V calculated here represents a variance between two images, like Expression (3).

Next, in step S1305, the corresponding-region determining unit 1202 determines whether matching has been performed between the guide image and all telephotograph images or not. If it is determined that matching with all telephotograph images has not been performed, the processing moves to step S1306. If it is determined that matching with all telephotograph images has been performed, the processing moves to step S1307.

In step S1306, the corresponding-region determining unit 1202 updates the camera number representing the reference image, which is stored in the RAM 202. The processing returns to step S1304.

In step S1307, the variance-value comparing unit 1203 compares all variance values V output from the corresponding-region determining unit 1202. Then, a minimum V is determined among the compared Vs, and information describing the telephotograph image corresponding to the V and $d_c$ corresponding to the V are output to a pixel-value replacing unit 1204.

Next, in step S1308, the pixel-value replacing unit 1204 replaces the pixel value of the occlusion region in the virtual viewpoint image based on the information describing the telephotograph image and $d_c$ output from the variance-value comparing unit 1203. Here, the pixel-value replacing unit 1204 replaces the pixel value of the occlusion region in the virtual viewpoint image by the pixel value of the image block indicated by the parallax $d_c$ in the telephotograph image described by the information output from the variance-value comparing unit 1203. Information to be output from step S1307 is information describing an image region close to the image region corresponding to the occlusion region in the virtual viewpoint image among image regions included in a plurality of telephotograph images. In other words, the replacement of the pixel value of the occlusion region by the pixel value of the region makes the virtual viewpoint image to be closer to the ideal.

Next, in step S1309, the pixel-value replacing unit 1204 judges whether the judgment of an occlusion region has been performed on all pixels of the virtual viewpoint image or not. If so, the processing moves to step S1310. If not, the processing moves to step S1303.

In step S1310, the pixel-value replacing unit 1204 outputs an image having all occlusion regions having replaced pixel values to an output unit 306.

The processing to be performed in the occlusion correcting unit 905 has been described above. Performing the aforementioned processing allows highly accurate search of corresponding points between images having both of different point-of-view positions and blurred states. Thus, a virtual viewpoint image may be generated by using, as a guide, an image from a point of view close to the virtual viewpoint and having different focal lengths. As a result, because image composition based on an actual scene may be achieved, the virtual viewpoint image may be generated with high accuracy.

According to this exemplary embodiment, the image acquiring unit 301 functions as an acquiring unit configured to acquire a first image of a subject viewed from a first point of view and a second image that is an image of the subject from a second point of view different from the first point of view and having a different blurred state from that of the first image. The blur adding unit 602 functions as a processing unit configured to change a blurred state of at least one of the first image and the second image. The rough-accuracy parallax calculating unit 902 functions as a determining unit configured to compare the first image and the second image after their blurred states are changed by the processing unit to determine image regions corresponding to a same subject between the first image and the second image. The rough-accuracy parallax calculating unit 902 functions as a determining unit configured to use the first image, the second image, and a third image including the same subject to that of the first image and the second image to determine image regions corresponding between the three images.

The high-accuracy parallax calculating unit 903 functions as a determining unit configured to use the first image and the third image, without using the second image, to newly determine image regions corresponding between the first image and the third image. In this case, the image region corresponding between the first image and the third image may be determined based on the image regions corresponding between the first image, the second image and the third image. The input unit 209 functions as an input unit configured to input image information describing a point-of-view position and a blurred state of an image based on a user instruction. The image synthesizing unit 904 functions as a generating unit configured to generate a virtual viewpoint image corresponding to the point-of-view position and blurred state described in the image information based on the image regions corresponding between the first image and the second image and the image information.

Third Exemplary Embodiment

According to the second exemplary embodiment, a virtual viewpoint image is generated by using a result of block matching performed by adding a blur on images acquired by an array camera. According to this exemplary embodiment, a virtual viewpoint image is generated by using a result of block matching performed by adding a blur on images captured by a Plenoptic camera by changing the aperture diameter.

Figure 14A:
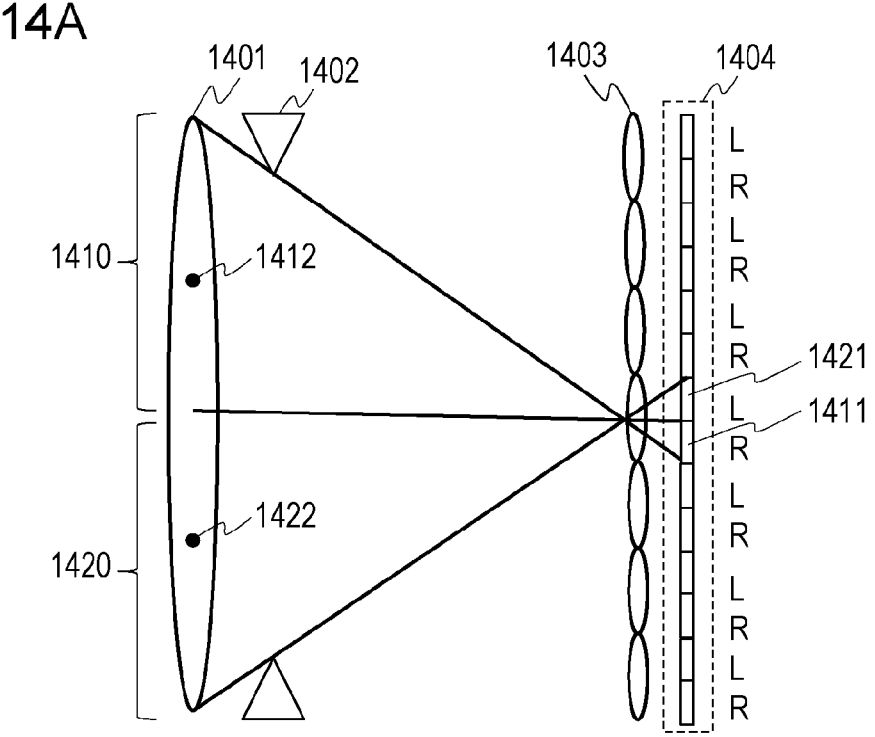
FIGS. 14A and 14B illustrate a principle of a Plenoptic camera.

A principle of a Plenoptic camera will be described with reference to FIG. 14A. A Plenoptic camera has a Plenoptic image capturing unit having a microlens array 1403 between an imaging lens 1401 and an imaging sensor 1404. Here, the microlens array 1403 includes a plurality of minute convex lenses (microlenses) arranged two-dimensionally. The microlenses are arranged such that light passing through one microlens may focus on a plurality of pixels in the imaging sensor 1404. The microlens array 1403 according to this exemplary embodiment is configured such that the microlenses may correspond to 2×2=4 pixels of the imaging sensor 1404. Thus, as illustrated in FIG. 14A, light passing through different regions of the imaging lens 1401 may enter to different regions of the imaging sensor 1404 through the microlens array 1403. In other words, imaging through the microlens array 1403 allows separation of light passed through different region of the imaging lens 1401. Apparently, the configuration of the microlens array is not limited thereto, but an arbitrary number of pixels may be set to correspond to the microlenses. The microlens array 1403 is disposed on a focal surface of the imaging lens 1401.

Figure 14B:
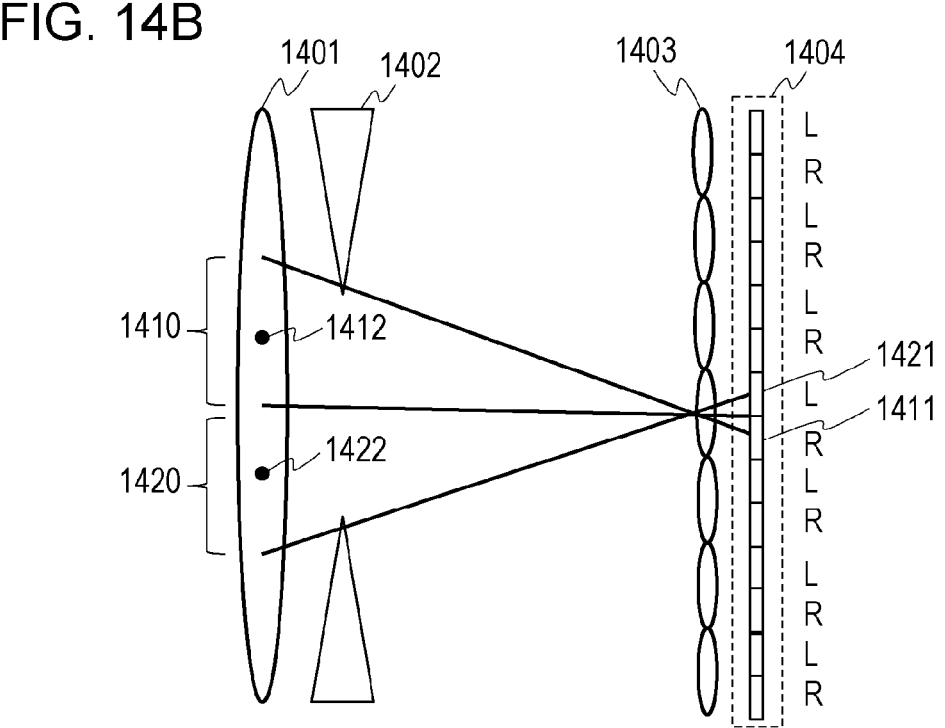

Referring to FIG. 14A considering the horizontal direction only for easy understanding, light passed through the 3 imaging lens 1401 may be separated into light passed through a right side region 1410 in the imaging lens 1401 and light passed through a left side region 1420 of the imaging lens 1401. In other words, the light passed through the right side region 1410 all enters to an R pixel represented by a pixel 1411 while the light passed through the left side region 1420 all enters to an L pixel represented by a pixel 1421. Thus, the R pixel and the L pixel may be extracted so that an R image as if it has been captured by using the right side region 1410 only and an L image as if it has been captured by using the left side area 1420 only may be acquired. In this case, the points of view corresponding to the R image and L image are a point 1412 and a point 1422, respectively. As illustrated in FIG. 14B, when the diameter of the aperture 1402 is reduced, the center points of the right side region 1410 and left side region 1420 change with it, which may reduce the parallax between the R image and the L image.

Figure 15A:
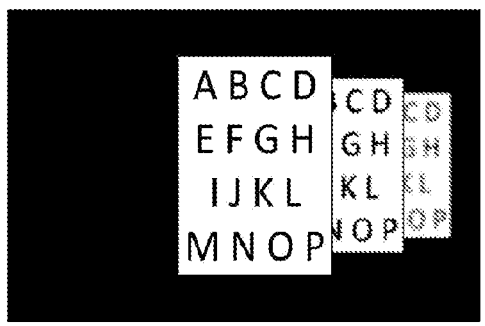
FIGS. 15A to 15D illustrate example images acquired by a Plenoptic camera.
Figure 15B:
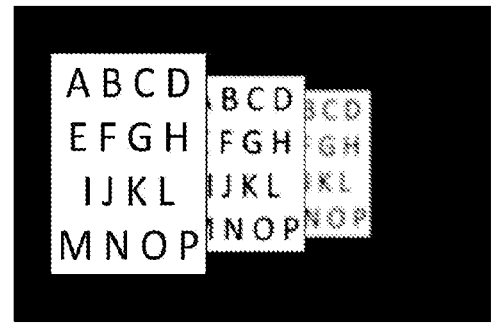
Figure 15C:
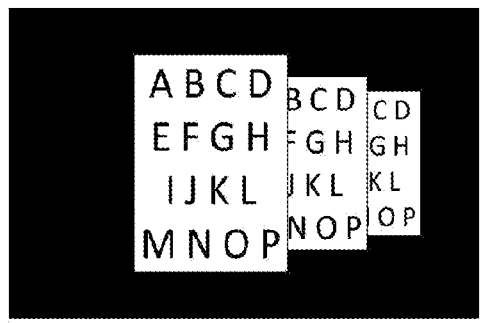
Figure 15D:
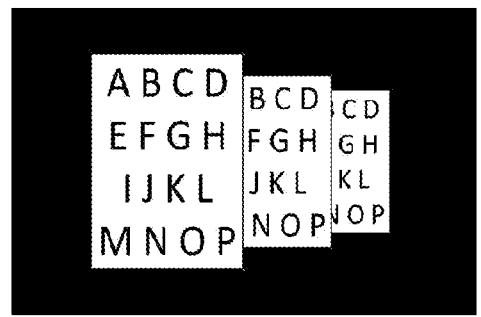
Figure 18A:
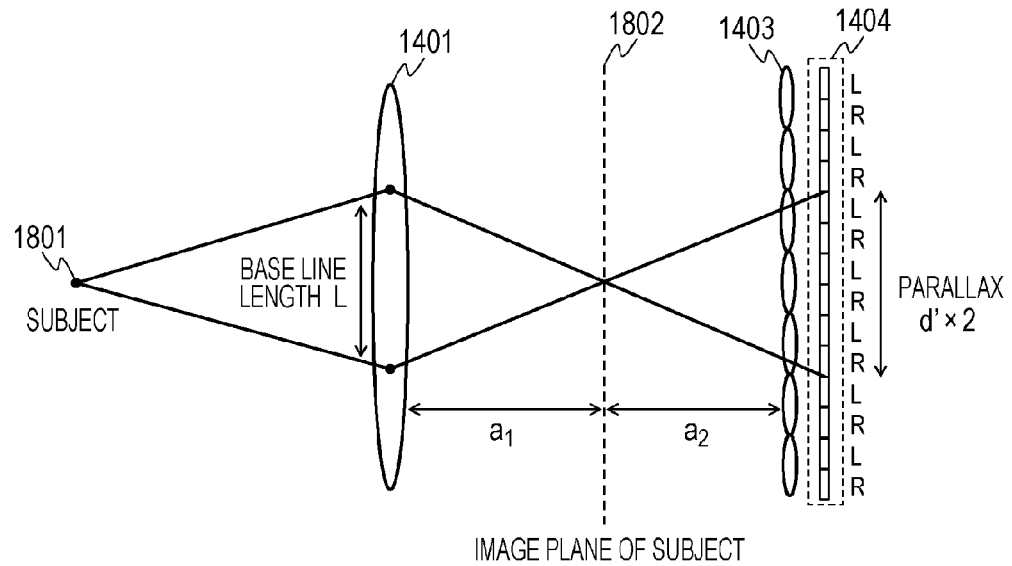
FIGS. 18A and 18B illustrate a relationship between a diameter of a blur and a parallax in a Plenoptic camera.
Figure 18B:
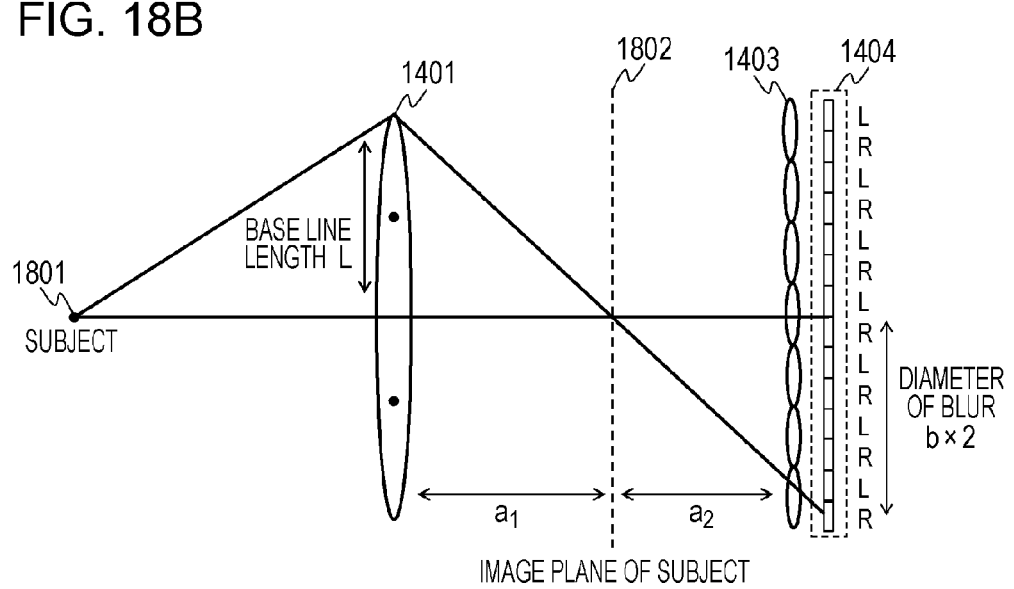

FIGS. 15A to 15D illustrate examples of the R image and L image acquired by a Plenoptic camera according to this exemplary embodiment. FIGS. 15A and 15B illustrate an L image and an R image captured with an aperture open as illustrated in FIG. 18A. FIGS. 15C and 15D illustrate an L image and an R image captured with an aperture narrowed as illustrated in FIG. 18B. Because the images in FIGS. 15A and 15B are captured with an aperture open, the points of view of the L image and R image are closer to an outer side of the imaging lens 1401, which provides a large base-line length between the point of view of the L image and the point of view of the R image. Because those images are captured with a larger aperture, the depth of field is small, and a distant view of the image may have a blur. On the other hand, because the images in FIGS. 15C and 15D are captured with a narrowed aperture, the points of view for the L image and R image are close to an inner side of the imaging lens 1401, and the base-line length of the points of view for the two image is small. Because it is captured with a smaller aperture, the depth of field is large.

In this way, a plurality of images at a different points of view may be captured by one imaging operation with a Plenoptic camera, and the base-line length between the points of view of the plurality of images may be changed by adjusting the aperture of the Plenoptic camera. However, such adjustment of an aperture may change the depth of field of the resulting image in accordance with the size of the aperture. Thus, an image having both of a desired base-line length and depth of field may not be acquired easily.

Accordingly, according to this exemplary embodiment, an imaging operation is performed twice by changing the aperture diameter of the Plenoptic camera to acquire image data captured with a desired base-line length and image data captured with a desired depth of field and thus perform matching between the image data by adding a blur thereto. The result may be used to generate a virtual viewpoint image having the desired base-line length and depth of field from the image data.

A configuration of this exemplary embodiment will be described below. The image processing apparatus according to this exemplary embodiment further includes a parameter calculating unit 1601 configured to calculate imaging parameters corresponding to a base-line length and depth of field input by a user in addition to the configuration illustrated in FIG. 2. The parameter calculating unit 1601 is connected to the bus 204, like the other components. The image capturing units 101 to 102 are replaced by a Plenoptic image capturing unit 1602.

Figure 16:
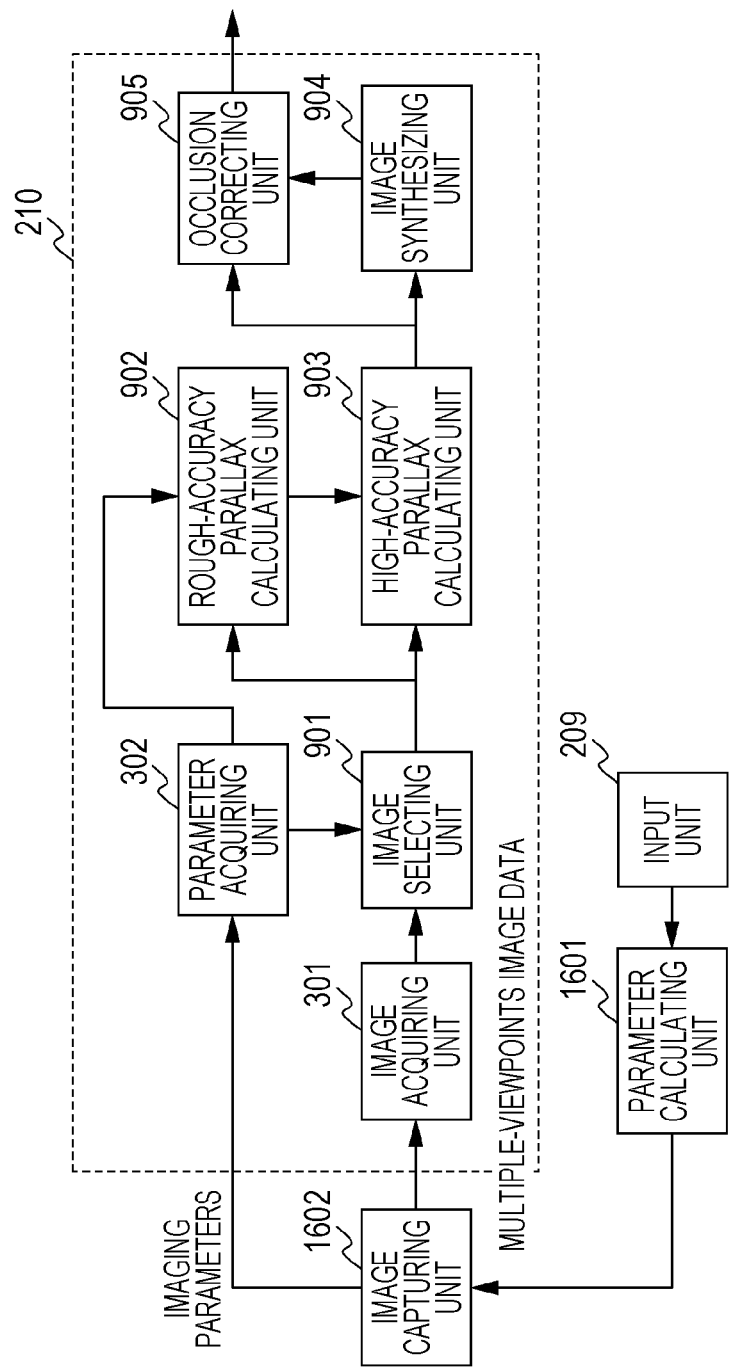
FIG. 16 illustrates a configuration of an image processing unit according to a third exemplary embodiment.

Processing of this exemplary embodiment will be described below with reference to the block diagram illustrated in FIG. 16 and the flowchart illustrated in FIG. 17. The same numbers refer to the same parts used for the first exemplary embodiment or second exemplary embodiment, and the description will be omitted.

First, in step S1701, a user may input a desired base-line length and depth of field for generating a virtual viewpoint image through the input unit 209. The input base-line length and depth of field are output to the parameter calculating unit 1601.

In step S1702, the parameter calculating unit 1601 calculates imaging parameters for performing an imaging operation twice based on the base-line length and depth of field input in step S1701. The imaging parameters to be calculated here include aperture values for acquiring an L image and an R image with the desired depth of field and aperture values for acquiring the L image and R image with the desired base-line length. Then, the calculated imaging parameters are output to the image capturing unit 1602.

In step S1703, the image capturing unit 1602 performs an imaging operation twice based on the imaging parameters calculated in step S1702.

In step S1704, the image acquiring unit 301 acquires image data from the image capturing unit 1602, like step S401. In this case, the image acquiring unit 301 extracts a pixel corresponding to a same region of the imaging lens 1401 from the imaging sensor 1404 to acquire image data describing a plurality of images.

Next, the processes in steps S402 to S403 and steps S1002 to S1005 are performed, and the processing ends. Similar processing to that of the second exemplary embodiment is performed for the base-line length and the size of aperture of images by assuming that a region of the imaging lens corresponding to an image is one different camera. Through the processing above, a virtual viewpoint image may be generated which has both of a desired base-line length and a desired depth of field from image data captured with a Plenoptic camera.

When image data captured with a Plenoptic camera is to be used, like this exemplary embodiment, different expressions may be used for blur addition in matching. The expressions will be described below.

In an L image and an R image acquired with a Plenoptic camera, a correlation exists between a diameter b [pixel] of a blur of a subject and the size of a parallax d' [pixel] of points corresponding to the subject in the L image and the R image. The correlation will be described with reference to FIGS. 18A and 18B.

FIG. 18A illustrates a relationship between a base-line length L and a parallax d' of points of view corresponding to an L image and an R image. An image from a subject 1801 displaced from an in-focus position will be considered. Light emitted from the subject 1801 forms an image on an image plane 1802 and launches on different positions on the imaging sensor 1404. In this case, the distance between positions on the sensor on which the light beams launch is two times of the parallax d'. Assuming that the distance from the imaging lens 1401 to the image plane 1802 is equal to $a_1$ and the distance from the imaging sensor 1404 is equal to $a_2$, the two triangles through the image sensing surface has a scaling relationship. Thus, the following expression (11) may be satisfied.

$$L:a_1=2d':a_2 \quad (11)$$

Next, a diameter of a blur corresponding to the same subject 1801 will be considered with reference to FIG. 18B. Light beams emitted from the subject 1801 pass through the right side region of the imaging lens 1401, form images on the image plane 1802, then spread and launch on the imaging sensor 1404. The diameter of the range of the incident light is two times of the diameter b of the blur in the L image and R image. In this case, considering in the same manner as Expression (11), the following Expression (12) is satisfied.

$$L:a_1=2b':a_2 \quad (12)$$

From Expression (11) and Expression (12), the following Expression (13) may be obtained.

$$b=d' \quad (13)$$

This expression is always satisfied irrespective of the number of divisions of the point of view.

Next, differences in diameter and parallax of blurs between a large-aperture image captured with the aperture open and a small-aperture image captured with the aperture narrowed. It is assumed that the diameter of a blur of a subject in a large-aperture image is equal to $b_1$, and the diameter of a blur of the same subject in a small-aperture image is equal to $b_2$. Further assuming that the size of the parallax corresponding to the same subject between an R image and an L image in the large-aperture image is equal to $d'_1$ and the size of a parallax corresponding to the same subject between an R image and an L image in the small-aperture image is equal to $d'_2$ and from Expression (13), the following Expression (14) is satisfied.

$$|b_1-b_2|=|d'_1-d'_2| \tag{14}$$

In this case, assuming that the parallax between the R image of the large-aperture image and the R image of the small-aperture image is equal to d [pixel], $$d = \frac{|d'_1 - d'_2|}{2} \tag{15}$$

is satisfied. Thus, from Expressions (14) and (15), $$|b_1-b_2|=2d \tag{16}$$

is satisfied. In other words, the difference in size of the blur between the large-aperture image and the small-aperture image depends on the image parallax corresponding to the same point of view of the large-aperture image and the small-aperture image. In other words, to adjust the blur of the small-aperture image having a large depth of field to the blur of the large-aperture image having a smaller depth of field, the following filter may be applied to the small-aperture image based on the value of the parallax to be searched.

$$g_i(x,y,d)=C_i\exp\{-(x^2+y^2)/(2\sigma_i^2)\}$$

$$\sigma_i=2d \tag{17}$$

Use of this expression may achieve matching by adding a blur with simpler expressions. It should be understood that, like the first exemplary embodiment, a deconvolution process may be performed on an image having a smaller depth of field, instead of performing the blur addition process on an image having a larger depth of field.

According to this exemplary embodiment, the image acquiring unit 301 functions as an acquiring unit configured to acquire a first image of a subject viewed from a first point of view and a second image of the subject viewed from a different second point of view from the first point of view and having a different blurred state of the first image. The blur adding unit 602 functions as a processing unit configured to change a blurred state of at least one of the first image and the second image. The rough-accuracy parallax calculating unit 902 functions as a determining unit configured to compare the first image and the second image after a blurred state has been changed by the processing unit to determine the image region corresponding to a same subject between the first image and the second image. The rough-accuracy parallax calculating unit 902 functions as a determining unit configured to determine an image region corresponding among the first image, the second image, and a third image including the same subject as that of the first image and the second image.

The high-accuracy parallax calculating unit 903 functions as a re-determining unit configured to determine another image region corresponding between the first image and the third image, without using the second image. In this case, the determination is made based on an image region corresponding between the first image and the third image and an image region corresponding among the first image, the second image, and the third image.

The input unit 209 functions as an input unit configured to input image information describing the point-of-view position and blurred state of an image based on a user instruction. The parameter calculating unit 1601 functions as a control unit configured to control the size of the aperture of the Plenoptic image capturing unit so as to acquire a first image that is an image at the point-of-view position described in the image information and a second image that is an image having a blurred state described in the image information. The image synthesizing unit 904 functions as a generating unit configured to generate a virtual viewpoint image corresponding to the point-of-view position and blurred state described in the image information based on the image region corresponding between the first image and the second image and the image information.

Fourth Exemplary Embodiment

According to the first to third exemplary embodiments, the intensity of a Gaussian filter is changed in accordance with the position to be searched when a blur is added to an image. According to this exemplary embodiment, a configuration will be described for a case where the shape of a blur differs between image capturing units or a case where the shape of a blur is difficult to analytically define for a parallax to be searched. Because the configuration and processes of the image processing apparatus 210 according to this exemplary embodiment are fundamentally the same as those of the first exemplary embodiment, only differences from the first exemplary embodiment will be described. In an image processing apparatus according to this exemplary embodiment, a blur filter for a different shape based on a search position is applied in the blur addition process in step S703. In one configuration example for implementing the process, the image processing apparatus 210 of this exemplary embodiment stores a blur filter database representing blur filters indicating a blur characteristic of lenses of the image capturing unit 101 to 102 in the ROM 203. The blur filter database is referred in the blur addition process in step S703; therefore, a blur filter having a shape corresponding to the search position in an image is used.

FIG. 19A illustrates an example of the blur filter database. The blur filter database stores a look-up table (called an LUT) 1901 which stores appropriate blur filters for distances from a focus position of a subject contained in an image captured through lenses of the image capturing units 101 to 102. The LUT 1901 may be generated based on design values of lenses of the image capturing units 101 and 102, for example. FIG. 19B illustrates an example of a blur filter stored in the blur filter database. A filter 1902 is a blur filter having a size of 3×3 pixels which replaces a pixel value of a pixel of interest by a linear combination of pixel values of surrounding pixels. The size of the filter is not limited thereto. Each of the illustrated square regions represents a pixel, and a pixel with * represents a pixel of interest. The number described with each of the pixels indicates a weight to be applied to a pixel value of the pixel in a filtering process. The filter 1902 has an asymmetrical distribution of weight values about a pixel of interest, unlike a Gaussian filter. In step S703, the blur adding unit 602 converts a parallax value corresponding to a search position to a distance based on Expression (2), and a blur filter indicated on the LUT 1901 is read and used. The LUT 1901 may be a table describing a correspondence relationship between a parallax value (pixel) and a filter, instead of a table describing a correspondence relationship between distance and filter. Alternatively, instead of using such an LUT, a filter corresponding to a search position may be derived based on a simulation or a theoretical formula corresponding during a search for corresponding regions.

The aforementioned configuration allows highly accurate matching even in a case where the shape of a blur differs between image capturing units or a case where the shape of a blur may not be analytically defined for a search parallax. In order to apply the configuration to a Plenoptic camera according to the third exemplary embodiment, the correspondence relationship between distance from a focus position and blur filter may be held for cases with different sizes or shapes of the aperture of the main lens 1401.

Other Exemplary Embodiments

Exemplary embodiments of the present invention are not limited to the aforementioned exemplary embodiments but may include combinations of the aforementioned exemplary embodiments. For example, in the second or third exemplary embodiment, distance calculation may also be performed at the same time.

According to the aforementioned exemplary embodiment, the processing is performed by using image data describing an image captured with an array camera having a plurality of image capturing units or image data acquired with a Plenoptic camera. However, image data describing an image captured by another configuration may be used. For example, images captured by a plurality of cameras that are independent from each other.

Exemplary embodiments are not limited to one image processing apparatus, but an image processing system may be provided in which the functions of the image processing apparatus according to the aforementioned exemplary embodiments are assigned to a plurality of image processing apparatuses. For example, the image synthesis process and the occlusion region correction process may be performed by different image processing apparatuses may be used.

The configuration of the image processing apparatus of the present invention is not limited to that of any one of the exemplary embodiments. The functions of the blocks may be divided into a plurality of blocks, or a configuration may include a block having functions of a plurality of blocks. According to the aforementioned exemplary embodiments, the CPU 201 executes a program stored in the ROM 203 to cause the corresponding processing circuit to operates, but the control unit, CPU 201, may execute all of the processes. Alternatively, all processes may be performed by one processing circuit, without using the control unit 201.

The present invention may be embodied as a system, an apparatus, a method, a program or a storage medium, for example. The present invention may be applied to a system including a plurality of apparatuses or may be applied to an apparatus including one device.

The present invention may be implemented by supplying to a system or an apparatus a storage medium storing software program code which implements a function (such as a process described in the aforementioned flowchart) according to the exemplary embodiment. In this case, a computer (or a CPU or an MPU) in the system or apparatus may read out and execute program code stored in a computer-readable storage medium to implement the functions of the aforementioned exemplary embodiments. Such a program may be executed by one computer or may be executed by a plurality of computers.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262753, filed Dec. 19, 2013, and Japanese Patent application No. 2014-184463, filed Sep. 10, 2014 which are hereby incorporated by reference herein in their entirety.

What is claimed is:

1. An image processing apparatus comprising:
an input unit configured to input image information indicating a point-of-view position and a blurred state of an image based on a user instruction;
an acquiring unit configured to acquire a first image of a subject viewed from a first point of view and a second image of the subject viewed from a second point of view different from the first point of view, wherein the first image and the second image have different blurred states from each other;
a processing unit configured to change a blurred state of at least one of the first image and the second image;
a determining unit configured to compare the first image and the second image after the blurred state of at least one of the first image and the second image is changed by the processing unit to determine image regions corresponding to the subject between the first image and the second image;
a generating unit configured to generate a virtual viewpoint image corresponding to the point-of-view position and the blurred state indicated by the image information based on the corresponding image regions between the first image and the second image determined by the determining unit and the image information input by the input unit,
wherein
the acquiring unit further acquires a third image including a same subject as that in the first image and the second image;
the first image and the third image are images having a blurred state closer to a blurred state of the virtual viewpoint image than that of the second image;
the second image is an image viewed from a point-of-view position closer to the point-of-view position of the virtual viewpoint image than those of the first image and the third image;

the processing unit further changes a blurred state of at least one of the second image and the third image;

the determining unit further determines image regions corresponding between the second image and the third image based on the changed blurred state of at least one of the second image and the third image; and the generating unit generates the virtual viewpoint image by using the first image and the third image based on the corresponding image regions determined between the first image and the second image and the corresponding image regions determined between the second image and the third image.

2. The image processing apparatus according to claim 1, wherein the processing unit is configured to change the blurred state of at least one of the first image and the second image such that the blurred state of the first image and the blurred state of the second image match.

3. The image processing apparatus according to claim 1, wherein a degree of change of the blurred state to be performed by the processing unit is determined for each image region based on a position of the image region in an image having the blurred state to be changed.

4. The image processing apparatus according to claim 3, further comprising a blur filter to be applied to the first image and the second image and a database describing a correspondence relationship between positions of the image regions, wherein the processing unit refers to the database to determine the degree of change of the blurred state.

5. The image processing apparatus according to claim 1, further comprising a deriving unit configured to derive distance information on the subject based on the corresponding image regions determined by the determining unit between the first image and the second image.

6. The image processing apparatus according to claim 1, wherein the determining unit determines image regions corresponding among the first image, the second image, and the third image by using the first image, the second image, and the third image; and the apparatus further comprises a re-determining unit configured to newly determine image regions corresponding between the first image and the third image by using the first image and the third image and without using the second image based on the corresponding image regions among the first image, the second image, and the third image determined by the determining unit.

7. The image processing apparatus according to claim 1, wherein the blurred state is a size of a blur.

8. An imaging apparatus comprising:

an imaging unit having a Plenoptic image capturing unit;

an input unit configured to input image information describing a point-of-view position and a blurred state of an image based on a user instruction;

a control unit configured to control a size of an aperture of the Plenoptic image capturing unit such that a first image that is an image of the point-of-view position indicated by the image information and a second image that includes a same subject to that of the first image and is an image of the blurred state indicated by the image information are acquired by imaging;

a processing unit configured to perform a process for changing a blurred state of at least one of the first image and the second image;

a determining unit configured to compare the first image and the second image after the blurred state of at least one of the first image and the second image is changed by the processing unit to determine image regions corresponding between the first image and the second image; and a generating unit configured to generate a virtual viewpoint image corresponding to the point-of-view position and the blurred state indicated by the image information based on the image regions corresponding between the first image and the second image determined by the determining unit and the image information input by the input unit.

9. An image processing method comprising:

inputting image information indicating a point-of-view position and a blurred state of an image based on a user instruction;

acquiring a first image of a subject viewed from a first point of view and a second image of the subject viewed from a second point of view different from the first point of view and having a different blurred state from that of the first image;

processing the first image and the second image to change a blurred state of at least one of the first image and the second image;

determining, by comparing the first image and the second image after the blurred state of at least one of the first image and the second image is changed, image regions corresponding to a same subject between the first image and the second image;

generating a virtual viewpoint image corresponding to the point-of-view position and the blurred state indicated in the input image information based on the determined corresponding image regions between the first image and the second image and the input image information, wherein the acquiring includes further acquiring a third image including a same subject as that in the first image and the second image;

the first image and the third image are images having a blurred state closer to a blurred state of the virtual viewpoint image than that of the second image;

the second image is an image viewed from a point-of-view position closer to the point-of-view position of the virtual viewpoint image than those of the first image and the third image;

the processing further includes changing a blurred state of at least one of the second image and the third image;

the determining further includes determining image regions corresponding between the second image and the third image based on the changed blurred state of at least one of the second image and the third image; and the generating includes generating the virtual viewpoint image by using the first image and the third image based on the corresponding image regions determined between the first image and the second image and the corresponding image regions determined between the second image and the third image.

10. A method for processing an image captured by an imaging apparatus having a Plenoptic image capturing unit, the method comprising:

inputting image information describing a point-of-view position and a blurred state of an image based on a user instruction;

controlling a size of an aperture of the Plenoptic image capturing unit such that a first image that is an image of the point-of-view position indicated by the image information and a second image that includes a same subject to that of the first image and is an image of the blurred state indicated by the image information are acquired by imaging;

performing a process for changing a blurred state of at least one of the first image and the second image;

determining, by comparing the first image and the second image after the blurred state of at least one of the first image and the second image is changed by the process, image regions corresponding between the first image and the second image; and generating a virtual viewpoint image corresponding to the point-of-view position and blurred state described in the image information based on the determined image regions corresponding between the first image and the second image and the input image information.

11. A non-transitory storage medium storing a program causing a computer to execute an image processing method comprising:

inputting image information indicating a point-of-view position and a blurred state of an image based on a user instruction;

acquiring a first image of a subject viewed from a first point of view and a second image of the subject viewed from a second point of view different from the first point of view and having a different blurred state from that of the first image;

processing the first image and the second image to change a blurred state of at least one of the first image and the second image;

determining, by comparing the first image and the second image after the blurred state of at least one of the first image and the second image is changed, image regions corresponding to a same subject between the first image and the second image;

generating a virtual viewpoint image corresponding to the point-of-view position and the blurred state indicated in the input image information based on the determined corresponding image regions between the first image and the second image and the input image information, wherein the acquiring includes further acquiring a third image including a same subject as that in the first image and the second image;

the first image and the third image are images having a blurred state closer to a blurred state of the virtual viewpoint image than that of the second image;

the second image is an image viewed from a point-of-view position closer to the point-of-view position of the virtual viewpoint image than those of the first image and the third image;

the processing further includes changing a blurred state of at least one of the second image and the third image;

the determining further includes determining image regions corresponding between the second image and the third image based on the changed blurred state of at least one of the second image and the third image; and the generating includes generating the virtual viewpoint image by using the first image and the third image based on the corresponding image regions determined between the first image and the second image and the corresponding image regions determined between the second image and the third image.

12. A non-transitory storage medium storing a program causing a computer to execute a method for processing an image captured by an imaging apparatus having a Plenoptic image capturing unit, the method comprising:

inputting image information describing a point-of-view position and a blurred state of an image based on a user instruction;

controlling a size of an aperture of the Plenoptic image capturing unit such that a first image that is an image of the point-of-view position indicated by the image information and a second image that includes a same subject to that of the first image and is an image of the blurred state indicated by the image information are acquired by imaging;

performing a process for changing a blurred state of at least one of the first image and the second image;

determining, by comparing the first image and the second image after the blurred state of at least one of the first image and the second image is changed by the process, image regions corresponding between the first image and the second image; and generating a virtual viewpoint image corresponding to the point-of-view position and blurred state described in the image information based on the determined image regions corresponding between the first image and the second image and the input image information.

* * * * *